United States Patent
Chen et al.

(10) Patent No.: US 12,133,550 B2
(45) Date of Patent: Nov. 5, 2024

(54) MOLDING APPARATUS, CIGARETTE FILTER ROD AND PREPARATION METHOD THEREOF

(71) Applicant: CHINA TOBACCO HUNAN INDUSTRIAL CO., LTD., Hunan (CN)

(72) Inventors: Qian Chen, Hunan (CN); Yong Jin, Hunan (CN); Ke Li, Hunan (CN); Shitai Wang, Hunan (CN); Chao Tan, Hunan (CN); Saibo Yu, Hunan (CN); Haifeng Tan, Hunan (CN); Hongmei Fan, Hunan (CN); Qi Liu, Hunan (CN)

(73) Assignee: CHINA TOBACCO HUNAN INDUSTRIAL CO., LTD., Hunan (CN)

( * ) Notice: Subject to any disclaimer, the term of this patent is extended or adjusted under 35 U.S.C. 154(b) by 545 days.

(21) Appl. No.: 17/413,524

(22) PCT Filed: Dec. 14, 2018

(86) PCT No.: PCT/CN2018/121010
§ 371 (c)(1),
(2) Date: Jun. 11, 2021

(87) PCT Pub. No.: WO2020/118648
PCT Pub. Date: Jun. 18, 2020

(65) Prior Publication Data
US 2022/0022528 A1    Jan. 27, 2022

(51) Int. Cl.
A24D 3/02    (2006.01)
A24D 3/04    (2006.01)
(Continued)

(52) U.S. Cl.
CPC ............ *A24D 3/0237* (2013.01); *A24D 3/048* (2013.01); *A24D 3/08* (2013.01); *B29C 48/0022* (2019.02);
(Continued)

(58) Field of Classification Search
CPC ....... B29C 48/605; B29C 48/52; B29C 48/59; B29C 48/56; B29C 48/2564; B29C 48/885
See application file for complete search history.

(56) References Cited

U.S. PATENT DOCUMENTS 2,752,633 A * 7/1956 Weitzel ................. B29C 48/395
425/197
3,203,048 A * 8/1965 Daubenfeld .......... B29C 48/361
425/197
(Continued)

FOREIGN PATENT DOCUMENTS

CN        105011346 A    11/2015
CN        105982350 A    10/2016
(Continued)

OTHER PUBLICATIONS

International Search Report issued in International Application No. PCT/CN2018/121010 dated Aug. 29, 2019, 3 pages.

*Primary Examiner* — Emmanuel S Luk
(74) *Attorney, Agent, or Firm* — MASCHOFF BRENNAN; Ran Pang; Michael Mauriel

(57) ABSTRACT

A molding apparatus, a cigarette filter rod and a preparation method thereof are disclosed. The molding apparatus comprises a single-screw extrusion system and a cooling setting system. The single-screw extrusion system comprises a feeder and an extruder. The feeder is arranged on the extruder. The extruder comprises a cylinder. A heater is arranged outside the cylinder. A screw is arranged inside the cylinder, and a mouth mold is arranged at one end of the
(Continued)

cylinder. The cooling setting system comprises a round tube and a cooler. The cooler (6) is arranged outside the round tube. One end of the round tube is butted with the mouth mold of the extruder; and multiple groups of grooves are formed on threads of the head of the screw.

20 Claims, 2 Drawing Sheets

(51) Int. Cl.
| | |
|---|---|
| *A24D 3/08* | (2006.01) |
| *B29C 48/00* | (2019.01) |
| *B29C 48/06* | (2019.01) |
| *B29C 48/32* | (2019.01) |
| *B29C 48/395* | (2019.01) |
| *B29C 48/56* | (2019.01) |
| *B29C 48/80* | (2019.01) |
| *B29C 48/88* | (2019.01) |
| *B29C 48/885* | (2019.01) |
| *B65G 33/14* | (2006.01) |
| *B29K 29/00* | (2006.01) |
| *B29K 511/10* | (2006.01) |
| *B29L 31/00* | (2006.01) |
| *B29L 31/14* | (2006.01) |

(52) U.S. Cl.
CPC ............ *B29C 48/022* (2019.02); *B29C 48/06* (2019.02); *B29C 48/32* (2019.02); *B29C 48/397* (2019.02); *B29C 48/56* (2019.02); *B29C 48/832* (2019.02); *B29C 48/885* (2019.02); *B29C 48/911* (2019.02); *B65G 33/14* (2013.01); *B29K 2029/04* (2013.01); *B29K 2511/10* (2013.01); *B29L 2031/14* (2013.01); *B29L 2031/7416* (2013.01)

(56) References Cited

U.S. PATENT DOCUMENTS

| | | | | | |
|---|---|---|---|---|---|
| 3,570,654 | A | * | 3/1971 | Hill .................... | B29C 48/605 198/662 |
| 3,652,064 | A | * | 3/1972 | Lehnen ................ | B29C 48/64 425/208 |
| 3,762,692 | A | * | 10/1973 | Schippers ............ | B29C 48/56 366/147 |
| 3,913,897 | A | * | 10/1975 | Hanslik ............... | F04D 3/02 415/72 |
| 4,154,535 | A | * | 5/1979 | Maillefer ............ | B29C 48/686 366/144 |
| 4,154,536 | A | * | 5/1979 | Sokolow ............. | B29C 45/60 366/90 |
| 4,600,311 | A | * | 7/1986 | Mourrier ............. | B29C 48/505 366/322 |
| 5,932,159 | A | * | 8/1999 | Rauwendaal ........ | B29C 48/62 366/89 |
| 6,136,246 | A | * | 10/2000 | Rauwendaal ........ | B29C 48/404 366/89 |
| 6,602,064 | B1 | * | 8/2003 | Chen .................. | B29C 48/67 425/208 |
| 6,709,147 | B1 | * | 3/2004 | Rauwendaal ........ | B29C 48/395 366/80 |
| 9,480,281 | B1 | * | 11/2016 | Thomas .............. | A23K 10/38 |
| 2002/0062740 | A1 | * | 5/2002 | Brukov .............. | B01D 39/2065 425/467 |
| 2003/0075833 | A1 | * | 4/2003 | Thomson ........... | B29C 45/60 264/328.8 |
| 2003/0104093 | A1 | * | 6/2003 | Wurtele ............. | B29C 48/605 366/89 |
| 2004/0166191 | A1 | * | 8/2004 | Ellis ................... | B29C 48/2564 425/208 |
| 2005/0006850 | A1 | * | 1/2005 | Barth ................. | B29C 48/501 277/300 |
| 2007/0104022 | A1 | * | 5/2007 | Kuhman ............. | B29C 48/505 366/81 |
| 2010/0035064 | A1 | * | 2/2010 | Nam .................. | B29C 48/09 428/409 |
| 2013/0217833 | A1 | * | 8/2013 | Paul .................. | C08F 236/16 525/340 |
| 2013/0285273 | A1 | * | 10/2013 | Yusa ................. | B29B 7/801 366/78 |
| 2015/0273753 | A1 | * | 10/2015 | Barr .................. | B29B 7/429 366/79 |
| 2016/0361879 | A1 | * | 12/2016 | Johnson ............ | B29C 33/308 |
| 2017/0232416 | A1 | * | 8/2017 | Gil ................... | B29B 7/826 585/241 |
| 2019/0358855 | A1 | * | 11/2019 | Tanaka .............. | B29C 48/687 |
| 2022/0080620 | A1 | * | 3/2022 | Sato ................. | B29C 48/687 |
| 2023/0075388 | A1 | * | 3/2023 | Sato ................. | B29B 7/422 |

FOREIGN PATENT DOCUMENTS

| | | |
|---|---|---|
| CN | 107536095 A | 1/2018 |
| CN | 107536098 A | 1/2018 |
| CN | 109123769 A | 1/2019 |
| CN | 109123770 A | 1/2019 |
| CN | 109123772 A | 1/2019 |
| CN | 109123773 A | 1/2019 |
| CN | 109123774 A | 1/2019 |
| KR | 20010089850 A | 10/2001 |
| WO | WO-9730838 A1 * 8/1997 ............... B27N 3/28 |

\* cited by examiner

MOLDING APPARATUS, CIGARETTE FILTER ROD AND PREPARATION METHOD THEREOF

CROSS REFERENCE TO RELATED APPLICATIONS

This application is a U.S. National Phase application under 35 U.S.C. § 371 of International Application No. PCT/CN2018/121010 filed on Dec. 14, 2018.

The entire content of this application is hereby incorporated herein by reference.

FIELD OF THE INVENTION

The present invention relates to a molding apparatus, a cigarette filter rod and a preparation method thereof, belonging to the technical field of cigarettes.

BACKGROUND OF THE INVENTION

As a filter system for cigarette smoke, cigarette filter rods play an important role in improving the smoking quality and safety of cigarettes. However, the existing cigarette filter rods have single forms and simple functions, and the trend of cigarette homogeneity is increasingly serious. Therefore, the research and development of novel cigarette filter rods have reached unprecedented heights in the industry.

At present, most of the common cellulose acetate filter rods used in the tobacco industry are very simple in form and function. The novel filter rods developed by many enterprises, such as particle composite rods, paper composite rods, and hollow core composite rods, are difficult to promote and apply due to many reasons of cost, safety, environmental protection, efficiency, odor absorption and process. Particle flavored filter rods and the like that have been studied extensively in the tobacco industry in recent years are not obvious in flavoring effect and hardly achieve expected effects due to the amount of particles applied; meantime the flavoring methods are mainly focused on adding extra extracted or synthetic flavors. The extra flavors are expensive, limited in added amount, and have uncertain flavor lasting ability.

In addition, the existing flavored filter rods, including pop-bead filter rods, flavored particle rods, flavored threads, etc., are mainly based on extracted or synthesized flavors, which are expensive, have limited flavoring ability and are not separated from cellulose acetate filter rods, the molding equipment, raw materials and processing are high-cost, and cellulose acetate is difficult to degrade, causing serious environmental pollution. Some patents use cut tobacco or tobacco stems to make filter rods for cigarette harm reduction or flavoring, but there are many problems such as unstable quality and substandard roundness.

Moreover, the existing composite filter rods with cavities for dual-segment cigarettes are basically cellulose acetate composite rods. For example, patent CN200520021530 discloses a dual-segment composite filter rod of a cellulose acetate filter rod and a cellulose acetate cavity filter rod, which has the advantage of good anti-counterfeiting performance. Patent CN200920315424.1 discloses a hollow-head composite filter rod, which relates to a filter rod for manufacturing a cigarette filter, is composed of a plurality of cellulose acetate cells, and can effectively reduce cigarette tar and increase smoke dilution rate. The hollow sections of the filter rods in these patents are all made of cellulose acetate, and the consumption of cellulose acetate far exceeds that of ordinary cellulose acetate filter rods, which severely restricts the industrial application of such filter rods.

Patent CN201510061004 discloses a hollow cigarette filter rod of natural plant materials and a preparation method and application thereof. The hollow cigarette filter rod is prepared by a series of complex processes of cutting, grinding and perforating after briquetting natural plant materials. The method is complicated and costly. The hollow cigarette filter rod has a dusty feeling when smoking and poor stability, so it is not suitable for industrial production.

SUMMARY OF THE INVENTION

In view of the shortcomings of the prior art, one of the objectives of the present invention is to provide a molding apparatus to realize molding of non-melting materials; and the second objective of the present invention is to provide a low-cost cigarette filter rod and a preparation method thereof.

In order to solve the above technical problem, the technical solution of the present invention is as follows:

A molding apparatus includes a single-screw extrusion system and a cooling setting system, and the single-screw extrusion system includes a feeder and an extruder; the feeder is arranged on the extruder; the extruder includes a cylinder, a heater is arranged outside the cylinder, a screw is arranged inside the cylinder, and a mouth mold is arranged at one end of the cylinder;

The cooling setting system includes a round tube and a cooler; the cooler is arranged outside the round tube; one end of the round tube is butted with the mouth mold of the extruder; and multiple groups of grooves are formed on threads of the head of the screw.

Further, a machine head is mounted at an outlet end of the cylinder, the mouth mold is mounted on the machine head through a pressure relief plate and extends into the cylinder, and the mouth mold is movably connected with the machine head. Optionally, the mouth mold is in threaded connection with the machine head to realize stepless adjustment of the extension.

Further, the machine head has a first hole coaxial with the cylinder, the pressure relief plate has a second hole coaxial with the cylinder, and the mouth mold passes through the first hole and the second hole sequentially to extend into the cylinder.

Further, the distance between a feeding end of the mouth mold and the head of the screw is 5 to 60 mm, generally 10 to 50 mm, and further 15 to 35 mm. By adjusting the distance, the density of a particle round rod can be controlled, and then its hardness and air permeability can be controlled.

Further, the pressure relief plate is fixed in the center of the machine head, and an adjustable gap of 1 to 5 mm is maintained between the two. The pressure relief capacity can be controlled by adjusting the gap, and then the extrusion pressure on materials inside the cylinder and the air permeability of the particle round rod can be controlled.

Further, the middle section of the pressure relief plate covering the cylinder is round or square; when it is round, its area is not smaller than the cross-sectional area of the cylinder; and when it is square, its minimum length is not smaller than the inner diameter of the cylinder. It can thus be ensured that proper pressure is applied to the materials inside the cylinder and particles are bonded more reliably. Further, the grooves are parallel to the axis of the screw.

Further, spiral protrusions formed on the surface of the screw are the threads. The cross section of the threads along the axis of the screw is preferably rectangular, trapezoidal or toothed.

Preferably, the grooves have a depth identical to the height of the threads, and a width of 2 to 4 mm.

Further, 3 to 5 groups of grooves parallel to the axis of the screw are formed on the threads of the head of the screw. Preferably, every two adjacent groups of grooves are preferably equally spaced.

Further, the connecting lines of the groups of grooves are parallel to the axial direction of the screw; further, the groups of grooves are uniformly distributed on the outer circumference of the screw.

Further, the screw includes equidistant threads, and the threads are rectangular, trapezoidal or toothed threads having a height of 3 to 5 mm.

Further, the threads have a pitch of 10 to 30 mm.

Optionally, the screw is a 20-equidistant screw.

In the present invention, the round tube is butted with the mouth mold. The round tube is used to receive a molded product discharged from the mouth mold and having a high temperature.

Further, the inner diameter of the round tube is 0.3-1.0 mm larger than that of the mouth mold. The materials after extruded by the mouth mold are bulked to a certain extent, and the materials are fed into the round tube having a slightly large inner diameter, and quickly cooled for setting to output loose and well air-permeable particle round rods from the other end of the round tube.

That is, the inner diameter of the round tube is 0.3 to 1.0 mm larger than the inner diameter of the output end of the mouth mold. The materials after extruded by the mouth mold are bulked to a certain extent, and the materials are fed into the round glass tube having a slightly large inner diameter, and quickly cooled for setting to output loose and well air-permeable natural plant particle round rods from the other end of the round tube.

That is, the inner diameter of the round tube is 0.3 to 1.0 mm larger than the inner diameter of the output end of the mouth mold.

Further, the round tube is tightly connected with the mouth mold.

Optionally, the round tube is a round glass tube.

Further, the cooler is sleeved on the round tube.

Further, the cooler is a water-cooled or air-cooled cooler, or a conventional air-cooled or water-cooled cooler in the prior art.

Further, a shuttle-type shunt is arranged at the mouth mold of the cylinder.

Further, the cross section of the shuttle-type shunt is circular, elliptical, polygonal, quincuncial or heart-shaped. The shape of the cavity section of the filter rod can be controlled by controlling the shape of the shuttle-type shunt.

Further, the area of the maximum cross section of the shuttle-type shunt is 20-80% of the cross-sectional area of the mouth mold, preferably 30-70%.

Based on the same inventive concept, the present invention further provides a preparation method of cigarette filter rods, carried out using the above-mentioned molding apparatus, including the following steps:

S1, mixing a raw material with an adhesive uniformly to obtain a mixture;

wherein, the raw material includes one of natural plant particles, tobacco particles, flavored plant particles, and tobacco powder;

S2, continuously feeding the mixture obtained in S1 into the cylinder of the extruder through the feeder, extruding the mixture from the mouth mold into the round tube of the cooling setting system under the extrusion of the screw, followed by cooling setting and extrusion to obtain particle round rods; and S3, direct cutting the particle round rods obtained in S2, or wrapping the particle round rods with molding paper and then cutting them to obtain the cigarette filter rods.

Further, a preparation method of cigarette filter rods with flavor supplementing function includes: sizing tobacco particles, then continuously feeding the tobacco particles into the cylinder of the extruder through the feeder, extruding the tobacco particles from the mouth mold into the round tube of the cooling setting system under the extrusion of the screw, followed by cooling setting and extrusion to obtain round tobacco particle rods; and molding the round tobacco particle rods by direct cutting or wrapping with molding paper and then cutting to obtain the cigarette filter rods.

Further, a preparation method of cigarette filter rods with flavoring function includes: mixing an edible flavor with particles of natural plant materials to obtain flavored plant particles, applying an adhesive to the flavored plant particles, then continuously feeding the particles into the cylinder of the extruder through the feeder, extruding the particles from the mouth mold into the round tube of the cooling setting system under the extrusion of the screw, followed by cooling setting and extrusion to obtain round tobacco particle rods; and direct cutting the round tobacco particle rods or wrapping the round tobacco particle rods with molding paper and then cutting them to obtain the cigarette filter rods.

Further, a preparation method of natural flavored cigarette filter rods includes the following steps:

step (1): obtaining particles made of plant by pulverizing and sieving plant materials; or to obtain composite flavor particles by pulverizing, granulating, and sieving natural plant materials; wherein the natural plant materials include natural plant flavors;

step (2): applying an adhesive to the natural plant particles or composite flavor particles, and preparing round plant particle rods by using the molding apparatus; and step (3): direct cutting the round plant particle rods or wrapping the round plant particle rods with molding paper and then cutting them to obtain the cigarette filter rods.

Further, a preparation method of environment-friendly cigarette filter rods includes the following steps:

1) preparing natural plant particles from natural plant materials as raw materials;
2) treating the natural plant particles after moisture equilibrium with a hot melt adhesive through an ultra-high-speed mixer to soften the hot melt adhesive and mix the adhesive with the natural plant particles uniformly to obtain a mixture;
3) transporting the mixture while hot to the molding apparatus to prepare natural plant particle round rods; that is, continuously feeding the mixture into the cylinder of the extruder through the feeder, extruding the mixture from the mouth mold into the round tube of the cooling setting system under the extrusion of the screw, followed by cooling setting and extrusion to obtain natural plant particle round rods; and
4) direct cutting the natural plant particle round rods or wrapping the natural plant particle round rods with molding paper and then cutting them to obtain the cigarette filter rods.

Optionally, the ultra-high-speed mixer is a commercially available conventional ultra-high-speed mixer.

Further, a preparation method of degradable cigarette filter rods includes the following steps:
1) preparing natural plant particles from natural plant materials as raw materials;
2) mixing the natural plant particles with an adhesive uniformly to obtain a mixture;
3) preparing natural plant particle round rods from the mixture by using the molding apparatus; that is, continuously feeding the mixture into the cylinder of the extruder through the feeder, extruding the mixture from the mouth mold into the round tube of the cooling setting system under the extrusion of the screw, followed by cooling setting and extrusion to obtain natural plant particle round rods; and
4) direct cutting the natural plant particle round rods or wrapping the natural plant particle round rods with molding paper and then cutting them to obtain the cigarette filter rods.

The molding apparatus of the present invention can realize one-step molding and preparation of filter rods from natural plant particles, and can realize continuous production to greatly simplify the preparation process of the existing cigarette filter rods; and the equipment used is simple and the cost is low, which is beneficial to industrial production. The preparation of the existing cellulose acetate filter rods has the problem of expensive molding equipment and raw materials, resulting in high production cost; the cellulose acetate is a chemical fiber, and the cellulose acetate discarded after cigarette smoking is extremely difficult to degrade in the natural environment, causing serious pollution; and the exiting acetate cellulose filter rods are difficult in meeting the increasing individual needs of consumers. In some embodiments of the present invention, since natural plant materials are used as the raw materials of the filter rods, the raw materials have a wide range of sources and low costs; these raw materials mainly derived from food materials are more secure; these materials also have good degradation performance, and the filter rods will be decomposed into organic fertilizers to feed back to the nature after being discarded, so the filter rods have better environment friendliness; and the filter rods are fundamentally different from the existing cigarette filter rods in terms of structure and appearance, and can thus be used as perfect substitutes for the existing cigarette filter rods. In some embodiments of the present invention, the filter rods are formed by bonding natural plant particles with an adhesive, and there are voids between the plant particles to provide good smoke channels, which can effectively reduce the smoking resistance of the filter rods and is beneficial to diffusing smoke to the outside and reducing harmful ingredients in the smoke; and the natural plant particles have abundant voids, which have a better retention effect on the smoke.

In a preferred solution, the moisture content of the natural plant particle round rod is 8-12%. Maintaining the moisture content in a proper moisture range can ensure that the round plant particle rod is not mildewed, and the cigarette has good taste during smoking.

Further, a preparation method of hollow cigarette filter rods includes: mixing tobacco powder with an adhesive uniformly, then molding the mixture through the molding apparatus or pressing the mixture through a mold to obtain hollow strip-shaped round rods, and cutting the hollow strip-shaped round rods to obtain the hollow cigarette filter rods;
wherein the mold includes a central solid cylinder and a peripheral annular cavity.

In some embodiments of the present invention, the existing single-screw extruder is ingeniously improved and a simple mold is designed for use in the production process of cigarette filter rods, which can not only realize one-time molding of the hollow filter rods, but also can realize continuous production to greatly simplify the preparation process of the existing hollow cigarette filter rods; and the equipment used is simple and the cost is low, which is beneficial to industrial production. In some embodiments of the present invention, since waste tobacco materials are used as the raw materials of the filter rods, the raw materials have a wide range of sources and low cost; these tobacco materials also have good degradation performance, and the filter rods will be decomposed into organic fertilizers to feed back to the nature after being discarded, so the filter rods have better environment friendliness; and the filter rods are fundamentally different from the existing cigarette filter rods in terms of structure and appearance, and can thus be used as perfect substitutes for the existing cigarette filter rods. The filter rods are formed by bonding tobacco powder with an adhesive, and there are voids in the tobacco powder to provide good smoke channels, which is beneficial to diffusing smoke to the outside and reducing harmful ingredients in the smoke; and the natural plant particles have abundant voids, which have a better retention effect on the smoke. Particularly, the tobacco material retains the original flavor of tobacco, and can thus increase the flavor of cigarettes and improve the sensory quality of cigarettes.

In a preferred solution, the cross section of the solid cylinder is circular, elliptical, polygonal, quincuncial or heart-shaped. The shape of the cavity section of the filter rod can be controlled by controlling the shape of the solid cylinder.

In a preferred solution, the mass ratio of the tobacco powder to the adhesive is 10:(0.1-3), preferably 10:(0.5-2). Excessive consumption of the adhesive will block the voids in the tobacco powder, resulting in poor smoke diffusion. At the same time, the adhesive covering the surface of the tobacco powder will affect its retention capacity. If a little adhesive is used, the bonding performance will be poor and the hollow filter rod will be difficult to mold.

In a preferred solution, the tobacco powder includes at least one of waste tobacco powder, low-grade tobacco leaf powder, and upper tobacco leaf powder. The tobacco powder used as a raw material of the hollow filter rod can increase the flavor of cigarette tobacco.

In a more preferred solution, the tobacco powder is obtained by microwave sterilization and mechanical pulverization of at least one of waste tobacco, low-grade tobacco leaves, and upper tobacco leaves. The tobacco raw materials, such as waste tobacco, low-grade tobacco leaves and upper tobacco leaves, are used in cigarettes to a low degree, and can be used after special reconstitution, resulting in the disadvantage of high usage cost. In the solution of the present invention, the tobacco raw materials can be directly used only by drying, pulverization and the like, without special reconstitution, which greatly saves the usage cost.

In a more preferred solution, the tobacco powder has a particle size of 10 to 200 meshes, most preferably 20 to 150 meshes. The size of the tobacco powder determines the size of voids in the powder, and has a great impact on the diffusion and dilution of the filter rod. The preferred particle size of natural plant particles is conducive to reducing the tar and harm of cigarettes.

In a preferred solution, the adhesive includes a hot melt adhesive and/or a water-based adhesive. A suitable adhesive can bond the tobacco powder and ensure the cutting property of the hollow strip-shaped round rod.

In a more preferred solution, the water-based adhesive is at least one of modified starch, hydroxymethyl cellulose, hydroxypropyl cellulose, xanthan gum, guar gum, cyclodextrin, and chitosan. The preferred water-based adhesives can quickly bond the tobacco powder for molding, and these water-based adhesives have good stability, are safe for humans, and are suitable for use in cigarette filter rods.

In a more preferred solution, the hot melt adhesive is powder of at least one of polyolefin, polyurethane, and ethylene-vinyl acetate copolymer. The hot melt adhesive melted at a high temperature and solidified at a low temperature can be used for the bonding of tobacco powder, and the hollow strip-shaped round rod will be more flexible; and these hot melt adhesives have good stability, and are safe for humans and suitable for use in cigarette filter rods.

In a further preferred solution, the particle size of the powder of the hot melt adhesive is 80-200 mesh, which is conducive to uniform mixing with the tobacco powder and filling in the tobacco powder to improve the bonding performance.

In a preferred solution, a temperature control system is arranged both inside and outside the cylinder of the single-screw extruder. The temperature control system controls the internal temperature of the cylinder during the extrusion of the screw to be not more than 80° C. The temperature control system may be an electric cooling device or a simple circulating water cooling jacket, which ensures that the internal temperature of the cylinder of the screw extruder is less than 80° C. It can ensure that the properties of the materials before and after the extrusion almost do not change, and reduce the loss of flavor ingredients in the plant materials as much as possible.

In a preferred solution, the hollow strip-shaped round rod has a diameter of 23.50±0.15 mm, and a slitting length of 120 or 84 mm. In a preferred solution, the cross-sectional area of the hollow part of the hollow strip-shaped round rod is 20-80% of the total cross-sectional area of the hollow strip-shaped round rod, preferably 30-70%. If the hollow part is too small, the smoking resistance will be too large, it will be difficult to smoke, and the smoke is too concentrated to stimulate too much; and if the hollow part is too large, it means that the wall is thin, and the strength of the hollow rod is difficult to guarantee, which easily causes quality defects and affects the use.

In a more preferred solution, the cross section of the hollow part of the hollow strip-shaped round rod is circular, elliptical, polygonal, quincuncial or heart-shaped.

In a more preferred solution, the tobacco powder has a particle size of 10 to 200 meshes, preferably 20 to 150 meshes. The size of the tobacco powder determines the size of voids in the powder, and has a great impact on the diffusion and dilution of the filter rod. The preferred particle size of natural plant particles is conducive to reducing the tar and harm of cigarettes.

Further, before S 1, the natural plant materials are pulverized and sieved to obtain natural plant particles.

Further, before S1, the natural plant materials are pulverized, granulated, and sieved to obtain natural plant particles, that is, composite flavor particles.

Further, the natural plant materials are successively purified, dried, sterilized, pulverized and sieved to obtain natural plant particles. Further, the natural plant materials are dried to a moisture content of 5-10%.

In a preferred solution, the natural plant particles have a particle size of 10 to 100 meshes, preferably 20 to 80 meshes, more preferably 30 to 50 meshes. The size of the particles determines the size of voids between the natural plant particles, has a great impact on the smoking resistance of the filter rod, and also affects the diffusion and dilution of the smoke. The preferred particle size of natural plant particles is conducive to reducing the tar and harm of cigarettes, and reduces the smoking resistance.

In a preferred solution, the moisture of the natural plant particles is equilibrated to a moisture content of 5-15%, more preferably to a moisture content of 8-12%. Maintaining the moisture content in a proper moisture range can ensure that the plant particle materials are not mildewed, and the cigarette has good taste during smoking.

Further, the natural plant materials include natural plant flavors. Preferably, the natural plant flavors include at least one of clove, agastache rugosa, galangal, fennel, peppermint, angelica dahurica, cardamom, perilla, lily, coffee, cocoa, rose, coconut flour, sesame, and tea.

Further, the natural plant materials further include natural plant accessories; the natural plant accessories include at least one of shells of commercial crops, fruit peels, and wood; preferably, the natural plant accessories include at least one of rice hulls, bagasse, corncobs, walnut shells, coffee shells, peanut shells, softwood, coconut shells, orange peels, and grapefruit peels. The combined use of natural plant accessories (plant peel/shell) and natural plant flavors can help reduce the cost of flavor particles while ensuring sufficient aroma. The natural plant materials are highly biodegradable and environment-friendly.

In the present invention, the natural plant materials can be selected from natural plant flavors; the natural plant flavors are mainly derived from food materials with acceptable odors (aroma) and the filter rods prepared accordingly are safer and have more natural aroma.

In the present invention, the concentration of aroma can also be adjusted by adjusting the ratio between the natural plant flavors and the natural plant accessories, and the production cost can be controlled at the same time.

Further, in the natural plant materials, the weight part of the natural plant flavors is 1-100 parts; and the weight part of the natural plant accessories is less than or equal to 99 parts. It can also be considered that the weight percentage of the natural plant flavors in the natural plant materials is 1-100%. When the weight percentage of the natural plant flavors is 100%, the natural plant flavors are used as the raw materials of the filter rods. Preferably, in the natural plant materials, the weight part of the natural plant flavors is 5-100 parts; and the weight part of the natural plant accessories is less than or equal to 95 parts. It can also be considered that the weight percentage of the natural plant flavors in the natural plant materials is 5-100%.

In a preferred solution, the particle size of the composite flavor particles is 20 to 50 meshes.

Further, the composite flavor particles are made by pulverizing natural plant materials into plant powder of 100 to 200 meshes and then granulating the plant powder by a dry or wet method. Preferably, the pulverizing temperature of the natural plant materials is 20-50° C.

In the present invention, different types of natural plant materials can be respectively pulverized into plant powder with a particle size of 100 to 200 meshes; or different types of natural plant materials can be mixed and then pulverized into plant powder with a particle size of 100 to 200 meshes at a low temperature; the obtained plant powder is then granulated by a dry or wet method and sieved to obtain particles with a particle size of 20 to 50 meshes, which are composite flavor particles. The preferred particle size can maintain a proper smoking resistance of the prepared filter rods, and is beneficial to further improving the homogenization of the prepared composite flavor particles.

Further, before S1, edible flavors are mixed with the particles of natural plant materials to obtain flavored plant particles.

Further, the edible flavors include at least one of citrus flavors, fruit flavors, peppermint flavors, bean flavors, spicy flavors, milk flavors, meat flavors, nut flavors, liquor flavors, and vegetable flavors. Different types of flavors can be selected according to different consumer needs. For example, the edible flavors are bean flavor, peppermint essential oil, strawberry essence, milk flavor, etc.

In a preferred solution, the flavored plant particles are formed by spraying of an edible flavor solution onto the particles of natural plant materials and then vacuum microwave drying.

Further, in the flavored plant particles, the edible flavors are 0.01-5 wt % of the weight of the natural plant materials; preferably, in the flavored plant particles, the edible flavors are 0.1-3 wt % of the weight of the natural plant materials. That is, the loading amount of the edible flavors on the particles of the natural plant materials is 0.1-3 wt % (based on the weight of the natural plant materials). Appropriate consumption of flavors can ensure the effectiveness of flavoring, and will not cover up the inherent aroma of tobacco.

Further, the flavored plant particles are formed by spraying of an edible flavor solution onto the particles of natural plant materials and then vacuum microwave drying. Preferably, the moisture content of the flavored plant particles is 5-12%.

After the edible flavor solution is sprayed to the particles of natural plant materials, the particles are dried by vacuum microwave irradiation. Vacuum microwave drying to said moisture content helps to keep the aroma to the greatest extent without loss.

In a preferred solution, the mass ratio of the flavored plant particles to the adhesive is 100:(1-30). A proper adhesive ratio is beneficial to improving the performance of the prepared cigarette filter rod.

Further preferably, the mass ratio of the flavored plant particles to the adhesive is 100: (5-20).

The existing flavored filter rods, including pop-bead filter rods, flavored particle rods, flavored threads, etc., have limited flavoring ability and are not separated from cellulose acetate filter rods, the molding equipment, raw materials and processing are high-cost, and cellulose acetate is difficult to degrade, causing serious environmental pollution. The special cigarette filter rod molding apparatus designed in the technical solution of the present invention can realize one-step molding and preparation of cigarette filter rods with flavoring function from natural tobacco particles, and can realize continuous production to greatly simplify the preparation process of the existing cigarette filter rods; and the equipment used is simple and the cost is low, which is beneficial to industrial production. In some embodiments of the present invention, the filter rods with flavoring function are obtained by one-step molding of natural plant materials through the special molding apparatus, and since the raw materials of the filter rods are derived from edible flavors and natural plant materials, the filter rods are more secure; the materials also have good degradation performance, and the filter rods will be decomposed into organic fertilizers to feed back to the nature after being discarded, so the filter rods have better environment friendliness; and the filter rods are fundamentally different from the existing cigarette filter rods in terms of structure and appearance, have prominent flavoring ability, and can be used as perfect substitutes for the existing cigarette filter rods.

In some embodiments of the present invention, the filter rod is prepared by bonding natural plant flavors with aroma (odor coordinated with the aroma of tobacco), and is a natural flavored cigarette filter rod. The raw materials for the filter rod have good degradation performance, and the filter rod will be decomposed into an organic fertilizer to feed back to the nature after being discarded, so the filter rod has better environment friendliness; the filter rod is flavored by the inherent aroma of plants instead of exogenous aroma, so the aroma is more pure, natural and lasting; and the filter rod is fundamentally different from the existing cigarette filter rods in terms of structure and appearance, has prominent flavoring ability, and can well complement and improve the existing cigarette filter rod products.

A more preferred preparation method of natural flavored cigarette filter rods according to the present invention includes the following steps:

a): purifying, drying, sterilizing and pulverizing natural plant materials, screening 20-50 mesh particles (natural plant particles) with a suitable particle size; or purifying, drying, sterilizing and pulverizing natural plant materials into plant powder of 100 to 200 meshes, followed by dry or wet granulation and screening to obtain composite flavor particles with a particle size of 20 to 50 meshes; wherein the natural plant materials contain 1-100 parts by weight of natural plant flavors, and less than or equal to 99 parts by weight of natural plant accessories;

wherein the natural plant flavors are at least one of clove, agastache rugosa, galangal, fennel, peppermint, angelica dahurica, cardamom, perilla, lily, coffee, cocoa, rose, coconut flour, sesame, and tea;

wherein the natural plant accessories are at least one of rice hulls, bagasse, corncobs, walnut shells, coffee shells, peanut shells, softwood, coconut shells, orange peels, and grapefruit peels;

b): mixing the natural plant particles or composite flavor particles with an adhesive uniformly in a mass ratio of 100:(1-30);

c): preparing natural flavored particle round rods from the adhesive-applied natural plant particles/composite flavor particles by using a molding apparatus for round tobacco particle rods; and d) directly cutting the natural flavored particle round rods or wrapping the natural flavored particle round rods with molding paper and then cutting them to obtain the cigarette filter rods.

Preferably, the moisture content of the natural flavored cigarette filter rods is 9-10 wt %; and the density is 0.5-1.5 g/mL.

In a preferred solution, the density of the particle round rods prepared from natural plant particles as main raw materials is 0.1-5 g/mL, preferably 0.5-2.5 g/mL. The proper density of the round rod can ensure that the smoking resistance of the filter rods is maintained within an allowable range.

In some embodiments of the present invention, the moisture content of the particle round rods is 8-12 wt %. The proper moisture can ensure that the flavored plant particles or natural plant particles will not be mildewed, and the feeling of dryness during smoking is eliminated. In a preferred solution, the density of the particle round rods is 0.3-5 g/mL, preferably 0.5-3 g/mL. The proper density of the round rod can ensure that the smoking resistance of the filter rods is maintained within an allowable range.

The present invention further provides a cigarette filter rod with flavoring function, which is prepared by said preparation method.

Preferably, the moisture content of the cigarette filter rod with flavoring function is 8-12 wt %.

Preferably, the density of the cigarette filter rod with flavoring function is 0.3-5 g/mL, further preferably 0.5-3 g/mL.

In addition, the present invention further provides an application of the cigarette filter rod with flavoring function, which is used for preparing a cigarette directly or after being compounded with other cigarette filter rod.

The prepared flavored natural plant particle round rod can be directly used as a filter rod and compounded with a tobacco rod to prepare a cigarette, and can also be compounded with other cigarette filter rod and then compounded with a tobacco rod to prepare a cigarette.

Preferably, the other cigarette filter rod may be at least one of the existing ordinary filter rods, such as a cellulose acetate filter rod, a cellulose propionate filter rod, and a paper filter rod.

A preferred preparation method in the present invention includes the following steps:
1) purifying, drying, sterilizing and pulverizing natural plant materials, and screening particles with a particle size of 20 to 50 meshes; wherein the natural plant materials are selected from at least one of rice hulls, bagasse, corncobs, walnut shells, coffee shells, peanut shells, softwood, coconut shells, orange peels, and grapefruit peels;
2) spraying an edible flavor solution onto the particles of the natural plant materials, followed by uniform stirring and vacuum microwave drying to obtain flavored plant particles; wherein the moisture content of the flavored plant particles is 5-12%; wherein the edible flavors are at least one of citrus flavors, fruit flavors, peppermint flavors, bean flavors, spicy flavors, milk flavors, meat flavors, nut flavors, liquor flavors, and vegetable flavors;
3) mixing the flavored plant particles with an adhesive uniformly in a mass ratio of 100:(5-20);
4) preparing flavored plant particle round rods from the materials with the adhesive applied in step 3) by using the molding apparatus for tobacco particle round rods; and
5) directly cutting the natural plant particle round rods or wrapping the natural plant particle round rods with molding paper and then cutting them to obtain the cigarette filter rods.

The present invention further includes a cigarette filter rod prepared by using the preparation method, wherein the moisture content of the cigarette filter rod is 8-12 wt %; and the density is 0.3-5 g/mL.

Preferably, the moisture content of the cigarette filter rod is 9-10 wt %; and the density is 1.0-2.5 g/mL.

The present invention further provides an application of the cigarette filter rod prepared by the preparation method, which is used for preparing a cigarette directly or after being compounded with other cigarette filter rod.

In the present invention, the prepared cigarette filter rod can be directly used as a filter rod and compounded with a tobacco rod to prepare a cigarette, and can also be compounded with other cigarette filter rod and then compounded with a tobacco rod to prepare a cigarette.

Further, the natural plant materials include at least one of shells, residues and cores of commercial crops, melon peels, and wood. For example, the natural plant materials are selected from food materials or plant peels/shells in contact with food materials. Preferably, the natural plant materials include at least one of rice husks, bagasse, corncobs, walnut shells, coffee shells, peanut shells, softwood, coconut shells, orange peels, and grapefruit peels. In a more preferred solution, the particle size of the natural plant particles is 10 to 100 meshes, more preferably 20 to 80 meshes, and most preferably 30 to 50 meshes. The size of the particles determines the size of voids between the natural plant particles, has a great impact on the smoking resistance of the filter rod, and also affects the diffusion and dilution of the smoke. The preferred particle size of natural plant particles is conducive to reducing the tar and harm of cigarettes, and reduces the smoking resistance. The proper particle size can ensure that the prepared filter rod maintains a proper smoking resistance. These natural plant materials have rich fiber pore structures, which can be used to retain harmful ingredients of smoke. In addition, these materials have a wide range of sources, and are substantially natural food processing wastes, so the cost is relatively low. The natural plant materials are highly biodegradable and environment-friendly.

In the present invention, different types of natural plant materials can be respectively pulverized to said particle size and then mixed; or different types of materials can be mixed and then pulverized to said particle size.

Further, in S2, the natural plant particles after moisture equilibrium are treated with the hot melt adhesive through the ultra-high-speed mixer to soften the hot melt adhesive and mix the adhesive with the natural plant particles uniformly to obtain a mixture; further, the moisture of the natural plant particles is equilibrated to a moisture content of 5-15%; further, the moisture of the natural plant particles is equilibrated to a moisture content of 8-12%; and preferably, the hot melt adhesive includes at least one of polyethylene, microcrystalline wax, vinyl acetate, polyolefin, polyisobutylene, ethylene-vinyl acetate copolymer, and polymerized rosin.

Further, the mass ratio of the natural plant particles to the hot melt adhesive is 100: (0.5-15). Further, the mass ratio of the natural plant particles to the hot melt adhesives is 100:100:(1-10).

Further, in S3, the density of the particle round rod is 0.1 to 5 g/cm$^3$, and preferably, the density of the particle round rod is 0.3 to 3 g/cm$^3$.

In a preferred solution, the density of the natural plant particle round rod is 0.1 to 5 g/mL, further 0.3 to 5 g/mL, more preferably 0.3 to 3 g/mL, and further preferably 0.5 to 3 g/mL. If the density of the natural plant particle rod is smaller, the degree of fluffing is larger, the smoking resistance of the cigarette is smaller, but more adhesive is used when the natural plant particle rod is formed, which will cause a negative effect on the smoking taste of the cigarette. Therefore, keeping the natural plant particle round rod in an appropriate density range is conducive to obtaining excellent comprehensive performance.

Further, the tobacco particles are tobacco stem particles and/or reconstituted tobacco particles; the tobacco stem particles are obtained by pulverizing tobacco stems and then screening; the reconstituted tobacco particles are obtained by pulverizing tobacco raw materials, granulating, and screening; and the tobacco raw materials include tobacco leaves and tobacco stems.

In a preferred solution, the tobacco particles are tobacco stem particles and/or reconstituted tobacco particles in a mass ratio of 100:0 to 0:100. Further preferably, the tobacco particles include tobacco stem particles and reconstituted tobacco particles. Further, the mass ratio of the tobacco stem particles to the reconstituted tobacco particles in the tobacco particles is 90:10 to 20:80. Different ratios can change the flavoring effect and the performance of the filter rod significantly.

In a preferred solution, discarded or low-grade tobacco materials can be used as the tobacco stems or tobacco raw materials in the present invention to achieve the effect of waste utilization.

Further, the reconstituted tobacco particles are prepared by pulverizing tobacco raw materials to 100 to 200 meshes, and then performing dry or wet granulation. Preferably, during the preparation of the tobacco particles, the temperature of pulverizing is 20-50° C.

In the present invention, the tobacco raw materials such as tobacco leaves and tobacco stems are pulverized at a low temperature into tobacco powder of 100 to 200 meshes, followed by dry or wet granulation and screening to obtain reconstituted tobacco particles with a particle size of 20 to 50 meshes.

For example, in the present invention, tobacco stems are pulverized to 20 to 50 meshes at said temperature to obtain the tobacco stem particles. Alternatively, the tobacco raw materials are pulverized to 100 to 200 meshes at said temperature, followed by granulation to obtain reconstituted tobacco particles with a particle size of 20 to 50 meshes.

Further, the raw materials have a particle size of 20 to 80 meshes, and preferably, the tobacco particles have a particle size of 20 to 50 meshes.

In a preferred solution, the tobacco particles have a particle size of 20 to 80 meshes, preferably 20 to 50 meshes. The proper particle size can ensure that the prepared filter rod maintains a proper smoking resistance.

In a preferred solution, the tobacco stem particles have a particle size of 20 to 80 meshes, preferably 20 to 50 meshes.

In a preferred solution, the reconstituted tobacco particles have a particle size of 20 to 80 meshes, preferably 20 to 50 meshes.

In a preferred solution, the tobacco particles are obtained by pulverizing tobacco stems and then screening appropriate tobacco stem particles; the tobacco particles may also be reconstituted tobacco particles obtained by pulverizing tobacco raw materials and then granulating; and the tobacco particles may also be a mixture of the tobacco stem particles and the reconstituted tobacco particles. In the present invention, the raw material of the filter rod is derived from tobacco, which adds aroma to ensure that its aroma is more coordinated with the aroma of tobacco. Meanwhile, by reprocessing of the tobacco raw material, the internal aroma can be released more thoroughly and uniformly, thus obtaining a tobacco plant particle round rod with aroma complementing function.

Further, in S1, the adhesive is applied to the tobacco particles to obtain a mixture. The special cigarette filter rod molding apparatus designed in the technical solution of the present invention can realize one-step molding and preparation of cigarette filter rods with aroma complementing function from natural tobacco particles, and can realize continuous production to greatly simplify the preparation process of the existing cigarette filter rods; and the equipment used is simple and the cost is low, which is beneficial to industrial production.

In some embodiments of the present invention, the raw material of the filter rod is derived from tobacco, so the filter rod is more secure; the material has better degradation performance, and the filter rod will be decomposed into an organic fertilizer to feed back to the nature after being discarded, so the filter rod has better environment friendliness; the filter rod is flavored by the inherent aroma of tobacco instead of exogenous aroma, so the aroma is more harmonious and lasting; and the filter rod is fundamentally different from the existing cigarette filter rods in terms of structure and appearance, has prominent flavoring ability after the tobacco raw material is treated, and can well complement and improve the existing cigarette filter rod products. In a preferred solution, the moisture content of the tobacco particle round rod is 8-12%. The proper moisture can ensure that the tobacco particle material will not be mildewed, and the feeling of dryness during smoking is eliminated.

In a preferred solution, the density of the tobacco plant particle round rod is 0.1-5 g/mL, preferably 0.3-2.5 g/mL. The proper density of the round rod can ensure that the smoking resistance of the filter rod is maintained within an allowable range, and it is ensured as much as possible that the tobacco particles will not fall off.

A more preferred preparation method of the present invention includes the following steps:

1) pulverizing tobacco stems, followed by setting and sieving to obtain tobacco stem particles with a particle size of 20 to 50 meshes; pulverizing tobacco leaves and tobacco stems to 100 to 200 meshes and then granulating to obtain reconstituted tobacco particles with a particle diameter of 20 to 50 meshes;

mixing at least one of the tobacco stem particles and reconstituted tobacco particles as tobacco particles with an adhesive uniformly; wherein the mass ratio of the tobacco particles to the adhesive is 100:(1-30);

2) preparing tobacco particle round rods with aroma complementing function from the adhesive-applied tobacco particles by using the molding apparatus for tobacco particle round rods; and 3) directly cutting the tobacco particle round rods with aroma complementing function or wrapping the tobacco particle round rods with molding paper and then cutting them to obtain the cigarette filter rods.

The present invention further provides a cigarette filter rod with aroma complementing function prepared by said method.

Preferably, the moisture content of the cigarette filter rod with aroma complementing function is 8-12%.

Preferably, the density of the cigarette filter rod with aroma complementing function is 0.1-5 g/mL, further preferably 0.3-2.5 g/mL.

In addition, the present invention further provides an application of the cigarette filter rod with aroma complementing function, which is used for preparing a cigarette directly or after being compounded with other cigarette filter rod.

In a preferred solution, the tobacco plant particle round rod can be used in a cigarette directly or after being compounded with other cigarette filter rod.

Further, the adhesive includes at least one of a water-based adhesive and a hot melt adhesive. The appropriate adhesive can bond the raw materials for molding while ensuring the cutting property of the particle round rod.

In a preferred solution, the water-based adhesive refers to at least one of white latex for cigarettes, modified starch, Arabic gum, polyvinyl alcohol, sodium hydroxypropyl cellulose, and polyethylene glycol. The appropriate water-based adhesive can quickly bond the raw materials for molding, and these water-based adhesives have good stability, and are safe for humans and suitable for use in cigarette filter rods.

In a further preferred solution, the water-based adhesive is added by spraying after dissolution, and then stirred uniformly in a conventional manner.

In a preferred solution, the hot melt adhesive refers to at least one of polyethylene, microcrystalline wax, vinyl acetate, polyolefin, polyisobutylene, ethylene-vinyl acetate copolymer, and polymerized rosin. The preferred hot melt adhesive has good chemical stability, is safe for humans, and is suitable for use in cigarette filter rods. The hot melt adhesive melted at a high temperature and solidified at a low temperature can be used for the bonding of raw materials, and the particle round rod will be more flexible.

In a further preferred solution, the hot melt adhesive is added by spraying after melting, and then stirred uniformly in a conventional manner.

In a preferred solution, the mass ratio of the natural plant particles to the hot melt adhesive is 100:(0.5-15), more preferably 100:(1-10). Too much hot melt adhesive will cause few voids between the natural plant particles, resulting in large smoking resistance of the filter rod and poor smoke diffusion ability. At the same time, the hot melt adhesive covering the surfaces of the particle materials will affect the adsorption performance of the plant materials. Too little hot melt adhesive will cause poor bonding performance and difficulty in molding the filter rod.

In a preferred solution, the water-based adhesive is directly sprayed to the surfaces of the raw materials (such as tobacco particles), the hot melt adhesive is sprayed to the surfaces of the raw materials after melting, and the two are mixed uniformly by a conventional method. In a preferred solution, the water-based adhesive is sprayed directly on the surface of the natural plant materials or composite flavor particles. The natural plant materials or composite flavor particles are mixed uniformly by an existing conventional method after the adhesive is sprayed to their surfaces. For example, the water-based adhesive or its solution can be sprayed directly to the surfaces of the natural plant materials or composite flavor particles.

The hot melt adhesive is sprayed to the surfaces of the natural plant materials or composite flavor particles after melting.

In a preferred solution, the mass ratio of the tobacco particles to the adhesive is 100: (1-30), preferably 100:(5-20), and more preferably 100:(5-15). Too much adhesive will cause few voids between the natural plant particles, resulting in large smoking resistance of the filter rod and poor smoke diffusion ability. At the same time, the adhesive covering the surface of the particle materials will affect the adsorption performance of the plant materials. Too little adhesive will cause poor bonding performance and difficulty in molding the filter rod.

In a preferred solution, the mass ratio of the natural plant particles to the adhesive is 100:(1-30), and further preferably 100:(5-20).

In a preferred solution, the mass ratio of the composite flavor particles to the adhesive is 100:(1-30), and further preferably 100:(5-20).

Further, when the flavored plant particles are used as a raw material, optionally, the water-based adhesive is directly sprayed to the surfaces of the flavored plant particles. For example, the water-based adhesive and/or its solution can be sprayed directly to the flavored plant particles. The hot melt adhesive is sprayed to the surfaces of the flavored plant particles after melting. The flavored plant particles are mixed uniformly by an existing conventional method after the adhesive is sprayed to their surfaces.

A cigarette filter rod is prepared by the aforementioned preparation method.

The present invention further provides an application of the cigarette filter rod prepared by the preparation method, which is used for preparing a cigarette directly or after being compounded with other cigarette filter rod.

The present invention further provides a degradable cigarette filter rod prepared by the aforementioned method.

The present invention further provides an application of the degradable cigarette filter rod, which is applied to a cigarette filter.

In a preferred solution, the degradable cigarette filter rod is directly used as a cigarette filter, or the degradable cigarette filter rod is compounded with an ordinary filter rod(s) to form a dual-segment or multiple-segment composite filter for use.

In the present invention, the prepared cigarette filter rod can be directly used as a filter rod and compounded with a tobacco rod to prepare a cigarette, and can also be compounded with other cigarette filter rod and then compounded with a tobacco rod to prepare a cigarette.

In addition, the present invention further provides an application of the cigarette filter rod with aroma complementing function, which is used for preparing a cigarette directly or after being compounded with other cigarette filter rod.

In a preferred solution, the tobacco plant particle round rod can be used in a cigarette directly or after being compounded with other cigarette filter rod.

The present invention further provides an environment-friendly cigarette filter rod prepared by the aforementioned method.

The present invention further provides an application of the environment-friendly cigarette filter rod, which is applied to a cigarette filter.

In a preferred solution, the environment-friendly cigarette filter rod is directly used as a cigarette filter, or the environment-friendly cigarette filter rod is compounded with an ordinary filter rod(s) to form a dual-segment or multiple-segment composite filter for use.

The present invention further provides a hollow cigarette filter rod prepared by the aforementioned preparation method.

The present invention further provides an application of the hollow cigarette filter rod, which is applied to the preparation of a cigarette filter.

In a preferred solution, the hollow cigarette filter rod is compounded with an ordinary cellulose acetate filter rod to prepare a dual-segment composite cigarette filter.

In a more preferred solution, the composite length ratio of the hollow cigarette filter rod to the ordinary cellulose acetate filter rod is 10:15, 15:10 or 7:18.

In a more preferred solution, the hollow cigarette filter rod may be arranged at the end of the cigarette near the cut tobacco or the lips.

In a more preferred solution, the ordinary filter rod includes at least one of a cellulose acetate filter rod, a cellulose propionate filter rod, and a paper filter rod.

The single-screw extruder in the prior art is mainly used for extrusion molding of plastic, and its screw is divided into three sections in effective length, which are sequentially from a feeding port to a discharge port: a feeding section (L1), a melting section (L2) and a metering section (L3);

solid materials gradually become dense from the feeding port to the machine head in section L1, the solid materials are gradually melted with the gradual increase in temperature in section L2, the materials are in a molten high-temperature state in section L3, and the molten materials are cooled in different ways after passing through the mouth mold. In order to ensure smooth melting and extrusion of the materials, sections L1 and L2 are heating sections, and section L3 is a heating or cooling section according to the specific situation. However, the screw in such setting cannot be directly used for the bonding molding of non-melting tobacco powder of the present invention. The main reason is that section L1 to section L3 is a sharp pressurizing and heating process for the materials, and the materials become very dense and are gelatinized due to the high temperature and high pressure after entering section L2, which cannot meet the preparation of hollow strip-shaped round rods. On the one hand of the technical solution of the present invention, the head of the screw is provided with longitudinal grooves (as shown in FIG. 2), which can ensure that the particles are still loose after extrusion, so that the particles can be shunted into the mouth mold; and the mouth mold of the present invention is fixedly connected to the machine head through the pressure relief plate, a certain gap is reserved between the pressure relief plate and the machine head, and when the pressure in the cylinder is too high, the particles are shunted and extruded from the gap between the two to reduce the internal pressure, so that the particles enter the mouth mold under equal pressure as much as possible for further molding to ensure that the particle round rods have stable tightness and quality. On the other hand, a cooling device is arranged at the mouth mold of the screw extruder to quickly cool and solidify the materials extruded by the screw; and the particles are initially molded and bulked to certain extent after being extruded by the mouth mold, and the particles are fed into the glass round tube having a slightly large inner diameter, quickly cooled for setting and then output from the other end of the round tube to obtain particle filter rods with good looseness and air permeability, that is, cigarette filter rods of the present invention.

Compared with the Prior Art, the Technical Effects Brought by the Technical Solution of the Present Invention are:

1) The molding apparatus of the present invention can realize one-step molding and preparation of filter rods from raw materials, and can realize continuous production to greatly simplify the preparation process of the existing cigarette filter rods; and the equipment used is simple and the cost is low, which is beneficial to industrial production. The production equipment for existing cellulose acetate filter rods is complicated and expressive, and the preparation of cellulose acetate as a raw material is extremely cumbersome and consumes a lot.

2) The raw materials of the cigarette filter rods of the present invention, mainly derived from natural plant materials such as tobacco and food materials, are reliable and cheap; meanwhile, waste and low-grade tobacco raw materials are used as much as possible, so that the usage cost is lower; the raw material for the existing filter rods is cellulose acetate, which is an expensive chemical fiber material, and its safety is controversial; for example, when the raw materials are natural plant materials, the natural plant materials are mainly derived from food materials or natural plant materials in direct contact with the food materials, so that the safety is higher; and the natural plant materials not only have good biodegradability, but also can be decomposed into organic fertilizers to feed back to the nature, and therefore have better environment friendliness. In view of the production and use of filter rods, the natural plant materials are taken from natural food processing wastes, so the cost is relatively low.

3) The cigarette filter rod materials of the present invention can be degraded and decomposed into organic fertilizers to feed back to the nature after being discarded, and therefore are environment-friendly; the cellulose acetate material for the existing filter rods is extremely difficult to degrade, and will cause serious pollution and damage the environment after being discarded;

4) The cigarette filter rod of the present invention is more rounded and fuller, has high hardness, and remains unchanged in shape before and after smoking; the existing cigarette filter rod has low hardness and cannot avoid thermal collapse during smoking, and the filter deforms seriously after smoking, which affects the look and feel;

5) The cigarette filter rod of the present invention is formed by bonding raw materials, has the color of the tobacco raw material or other natural colors and very distinctive appearance, and therefore is easily accepted by consumers; the existing cellulose acetate filter rods have silk screen structures and are almost white, and their appearances are the same without any special features;

6) The production equipment for the filter rod of the present invention is simple, the preparation method is simple, and the use of raw materials can be regarded as waste recycling; the production equipment for the existing cellulose acetate filter rods is complicated and expressive, and the preparation of cellulose acetate as a raw material is extremely cumbersome and consumes a lot;

7) The cigarette filter rod of the present invention can be flavored by the inherent aroma of tobacco or natural plant flavors, so the aroma is pure, natural and lasting, the flavoring effect is more prominent, and the aroma is well coordinated with tobacco aroma.

8) The natural plant materials are all of fibrous structures with abundant voids, are natural adsorption materials, and can retain harmful ingredients in the smoke to a certain extent, so the filter rods have good stability and do not affect the sensory quality of cigarettes.

9) The natural plant particles are bonded into natural plant particle filter rods, and there are more voids between the natural plant particles to form smoke channels, which not only can reduce the smoking resistance, but also facilitates air exchange with the outside, reduce the diffusion of harmful gas, and are beneficial to increasing the contact area between the smoke and the natural plant particles and promoting the retention of harmful ingredients of smoke by the natural plant particles.

10) Tobacco raw materials discarded in the existing tobacco industry can be fully utilized, which improves the utilization of the tobacco raw materials. And after drying, pulverization, etc., the tobacco raw materials can be used directly without reconstitution, which greatly saves the usage cost. However, the tobacco raw materials, such as waste tobacco, low-grade tobacco leaves and upper tobacco leaves, are used in cigarettes to a low degree in the prior art, and generally require special reconstitution for use, resulting in the disadvantage of high usage cost.

11) The tobacco raw materials have the inherent aroma of tobacco, can enhance the flavor of cigarettes, and are more secure. The tobacco raw materials not only have good biodegradability, but also can be decomposed into organic fertilizers to feed back to the nature, and therefore have better environment friendliness.

12) The tobacco materials are of fibrous structures with abundant voids, and can retain harmful ingredients in the smoke to a certain extent. In addition, the tobacco powder is bonded into a hollow strip-shaped round rod, and there are more voids between the tobacco powder to forming smoke channels, which is conducive to air exchange with the outside and increases the diffusion of harmful gas.

13) The existing single-screw extruder is innovated and improved to meet the requirements of extrusion and bonding of tobacco powder and other raw materials, realize continuous production of hollow filter rods and solid filter rods, and solve the defect that the single-screw extruder in the prior art is difficult in adapting to the processing of non-thermoplastic raw materials.

DETAILED DESCRIPTION OF THE INVENTION

The following examples are intended to illustrate the content of the present invention, rather than to further limit the protection scope of the present invention.

Figure 1:
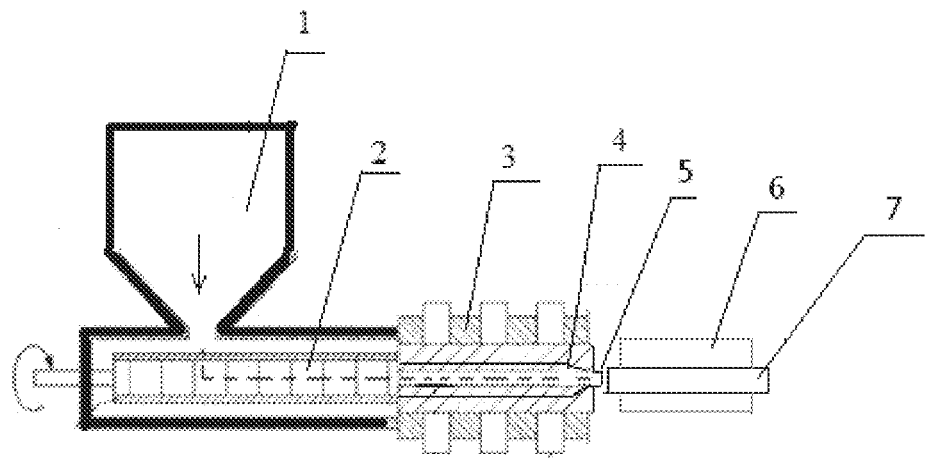
FIG. 1 is a schematic diagram of a molding apparatus according to the present invention.
Figure 2:
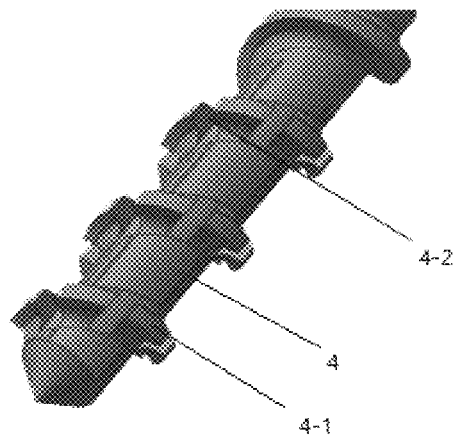
FIG. 2 is a schematic diagram of a head structure of a screw of the molding apparatus according to the present invention.
Figure 3:
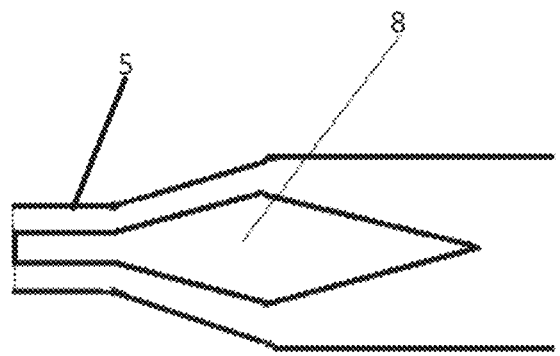
FIG. 3 is a schematic diagram of a shuttle-type shunt at a mouth mold.
Figure 4:
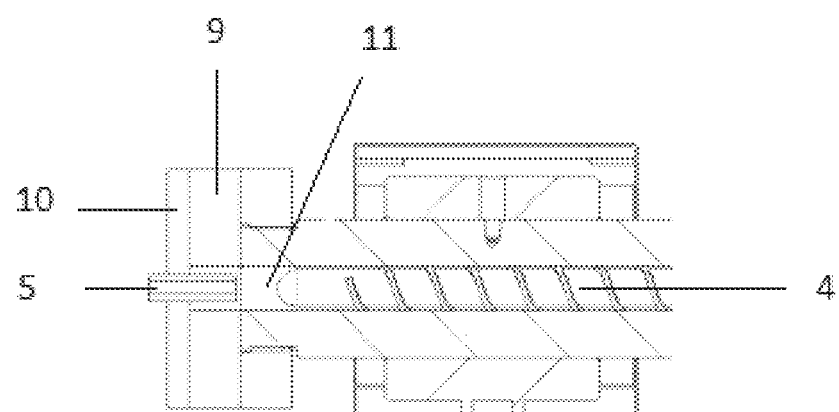
FIG. 4 is a schematic diagram of a cross-sectional structure at a machine head of the molding apparatus according to the present invention; In which: 1 feeder, 2 extruder, 3 heater, 4 screw, 4-1 thread; 4-2 groove; 5 mouth mold, 6 cooler, 7 round tube; 8 shuttle-type shunt; 9 machine head, 10 pressure relief plate, 11 cylinder.

As shown in FIGS. 1, 2, and 4, the molding apparatus used in the following embodiments includes a single-screw extrusion system and a cooling setting system;

The single-screw extrusion system includes a feeder 1 and an extruder 2; the feeder 1 is arranged on the extruder 2; the extruder 2 includes a cylinder, a heater 3 is arranged outside the cylinder, a screw 4 is arranged inside the cylinder, and a mouth mold 5 is arranged at one end of the cylinder; the mouth mold 5 is fixedly connected to a machine head 9 by means of a pressure relief plate 10;

The cooling setting system includes a round tube 7 and a cooler 6; the cooler 6 is arranged outside the round tube 7; one end of the round tube 6 is butted with the mouth mold 5 of the extruder 2; multiple groups of grooves 4-2 parallel to the axis of the screw 4 are formed in threads 4-1 on the head of the screw 4;

Mixed materials are continuously fed into the cylinder of the extruder 2 through the feeder. Under the extrusion of the screw 4, some of the materials are extruded from the gap between the pressure relief plate 10 and the machine head 9 and then recycled, and some other materials are extruded from the mouth mold 5 into the round tube 7 of the cooling setting system under a constant pressure, cooled for setting and extruded to obtain tobacco particle round rods;

The specific preparation method is referred to the following specific embodiments:

Embodiment 1

In this embodiment, 1) the screw 4 is a 20-equidistant screw, and the threads 4-1 are toothed threads with a height of 4 mm; the head of the screw 4 is provided with 4 groups of equidistant grooves 4-2; the grooves 4-2 are uniformly arranged along the outer circumference of the screw 4; the depth of the grooves 4-2 on the threads of the head of the screw 4 is the same as the height of the threads 4-1, and the width is 3 mm; 2) the glass round tube 7 with an inner diameter of 7.5 mm is connected behind the mouth mold 5 with an inner diameter of 7.0 mm, and the air-cooled cooler 6 surrounds the glass round tube 7; and 3) the distance between the feeding end of the mouth mold 5 and the head of the screw is 15 mm, and the pressure relief plate 10 is a 50 mm*50 mm*10 mm (thickness) square block, and is spaced from the machine head 9 by a gap of 2 mm.

The preparation method is: 1) tobacco stems are pulverized at 40° C. and sieved to obtain tobacco stem particles of 20-80 meshes for later use; 2) white latex for cigarettes, which accounts for 10% of the weight of the tobacco stem particles, is sprayed to the tobacco stem particles, followed by uniform mixing; 3) the adhesive-applied tobacco stem particles are extruded by using an improved single-screw extruder, and the materials preliminarily molded by the mouth mold enter the glass round tube, and are further finely cooled for setting and then extruded out from the other end to obtain loose and air-permeable tobacco stem particle round rods having a density of 0.6 g/mL (a moisture content of 12%); and 4) the tobacco stem particle round rods extruded are cut to be 100 mm in length to obtain the required tobacco stem particle cigarette filter rods. The filter rods can be directly used for rolling cigarettes.

Embodiment 2

In this embodiment: 1) the screw 4 is a 20-equidistant screw, and the threads 4-1 are toothed threads with a height of 4 mm; the depth of grooves 4-2 on the threads of the head of the screw 4 is the same as the height of the threads 4-1, and the width is 3 mm; the head of the screw 4 is provided with 4 groups of equidistant grooves 4-2; the grooves 4-2 are uniformly arranged along the outer circumference of the screw 4; 2) the glass round tube 7 with an inner diameter of 7.5 mm is connected behind the mouth mold 5 with an inner diameter of 7.2 mm, and the air-cooled cooler 6 surrounds the glass round tube 7; and 3) the distance between the inner end of the mouth mold 5 and the head of the screw is 25 mm, and the pressure relief plate 10 is a 50 mm*40 mm*10 mm (thickness) square block, and it is spaced from the machine head 9 by a gap of 3 mm.

The preparation method is: 1) tobacco stems are pulverized at 30° C. and sieved to obtain tobacco stem particles of 20-80 meshes for later use; 2) microcrystalline wax, which accounts for 8% of the weight of the tobacco stem particles, is sprayed to surfaces of the tobacco stem particles after being melted, followed by uniform mixing; 3) the adhesive-applied tobacco stem particles are extruded by using an improved single-screw extruder, and the materials preliminarily molded by the mouth mold enter the glass round tube, and are further finely cooled for setting and then extruded out from the other end to obtain loose and air-permeable tobacco stem particle round rods having a density of 0.9 g/mL (a moisture content of 8%); and 4) the tobacco stem particle round rods extruded are cut to be 100 mm in length to obtain the required tobacco stem particle cigarette filter rods. The filter rods can be directly used for rolling cigarettes.

Embodiment 3

In this embodiment, 1) the screw 4 is a 20-equidistant screw, and the threads 4-1 are toothed threads with a height of 4 mm; the depth of grooves 4-2 on the threads of the head of the screw 4 is the same as the height of the threads 4-1, and the width is 3 mm; the head of the screw 4 is provided with 4 groups of equidistant grooves 4-2; the grooves 4-2 are uniformly arranged along the outer circumference of the screw 4; 2) the glass round tube 7 with an inner diameter of 7.5 mm is connected behind the mouth mold 5 with an inner diameter of 6.5 mm, and the air-cooled cooler 6 surrounds the glass round tube 7; and 3) the distance between the inner end of the mouth mold 5 and the head of the screw is 10 mm, and the pressure relief plate 10 is a 050 mm*10 mm (thickness) cylinder, and it is spaced from the machine head 9 by a gap of 1.5 mm. The preparation method is: 1) tobacco leaves are pulverized into tobacco powder of 150 meshes, and the tobacco powder is placed in a spray drying granulator; a water-based adhesive solution of sodium hydroxypropyl cellulose with a certain mass concentration of 2% is prepared as an adhesive, and one-step granulation and drying are performed according to the standard operation process to prepare reconstituted tobacco particles; the reconstituted tobacco particles of 20-60 meshes are sieved out for later use; 2) tobacco stems are pulverized at 40° C. and sieved to obtain tobacco stem particles of 20-60 meshes; 3) the reconstituted tobacco particles are mixed uniformly with the tobacco stem particles in a mass ratio of 1:1; 4) an ethylene-vinyl acetate copolymer, which accounts for 10% of the weight of the mixed tobacco particles, is melted and then sprayed to the surfaces of the mixed tobacco particles, followed by uniform mixing; 5) the adhesive-applied mixed tobacco particles are extruded by using an improved single-screw extruder, and the materials preliminarily molded by the mouth mold enter the glass round tube, and are further finely cooled for setting and then extruded out from the other end to obtain loose and air-permeable mixed tobacco particle round rods having a density of 1.2 g/mL (a moisture content of 9%); and 6) the mixed particle round rods extruded are cut to be 120 mm in length to obtain the required coffee-flavor particle cigarette filter rods. The filter rods are compounded with ordinary cellulose acetate rods in a length ratio of 15:10 for rolling cigarettes.

Embodiment 4

In this embodiment, 1) the screw is a 20-equidistant screw, and the threads are toothed threads with a height of 4 mm; grooves on the threads of the head of the screw have a depth identical to the height of the threads and a width of 3 mm; the head of the screw 4 is provided with 4 groups of equidistant grooves 4-2; the grooves 4-2 are uniformly arranged along the outer circumference of the screw 4; 2) the glass round tube with an inner diameter of 7.5 mm is connected behind the mouth mold with an inner diameter of 6.8 mm, and the air-cooled cooler surrounds the round tube; and 3) the distance between the inner end of the mouth mold 5 and the head of the screw is 45 mm, and the pressure relief plate 10 is a 60 mm*40 mm*10 mm (thickness) square block, and it is spaced from the machine head 9 by a gap of 4 mm.

The preparation method is: 1) tobacco leaves are pulverized at 25° C. into 120-mesh tobacco powder; 2) a 1% water-based adhesive solution of modified starch is prepared; 3) the tobacco powder is mixed with the adhesive solution uniformly in a mass ratio of 100:20, and the mixture is granulated by using a swing granulator; 4) the wet particles are dried under vacuum at 40° C. to a moisture content of 10%, and then sieved to obtain reconstituted tobacco particles of 30 to 80 meshes for later use; 5) polyethylene accounting for 8% of the weight of the reconstituted tobacco particles is melted and then sprayed to the surfaces of the reconstituted tobacco particles, followed by uniform mixing; 6) the adhesive-applied reconstituted tobacco particles are extruded by using an improved single-screw extruder, and the materials preliminarily molded by the mouth mold enter the glass round tube, and are further finely cooled for setting and then extruded out from the other end to obtain tobacco particle round rods having a density of 0.7 g/mL and a moisture content of 8%; and 7) the tobacco particle round rods extruded are wrapped with molding paper, and then cut to be 100 mm in length to obtain the required tobacco particle cigarette filter rods. The filter rods can be directly used for rolling cigarettes.

Evaluation on Sample Cigarettes:

The cigarette filter rods prepared in Embodiments 1~4 are respectively rolled into cigarettes of the same brand, and the cigarettes are compared with conventional cellulose acetate filter rod cigarettes. The results are shown in Table 1.

TABLE 1

Comparison between Embodiments 1-4 and conventional cellulose acetate filter rod cigarettes

| Sample | Smoking resistance of filter rod/Pa | Smoking resistance of cigarette/Pa | Hardness of filter rod/% | Roundness of filter rod/mm | TPM/mg/cig | Smoking evaluation |
|---|---|---|---|---|---|---|
| Control | 2744 | 1078 | 88 | 0.35 | 12.30 | Mainly tobacco aroma, elegant and delicate aroma, ordinary amount of aroma, slight irritation |
| Embodiment 1 | 2700 | 1070 | 93 | 0.16 | 12.75 | Increased richness of aroma, good coordination |
| Embodiment 2 | 2830 | 1065 | 92 | 0.18 | 12.55 | Increased richness of aroma, good coordination |
| Embodiment 3 | 2780 | 1085 | 92 | 0.15 | 12.60 | Increased richness of aroma, good coordination |
| Embodiment 4 | 2750 | 1070 | 91 | 0.10 | 12.90 | Increased richness of aroma, good coordination |

It can be seen from the above evaluation results that the filter rods prepared in the present invention have an obvious flavoring effect, and the smoke retention effect is close to that of cellulose acetate cigarettes. The filter rods of the present invention have controllable smoking resistance, greatly improved hardness and distinctive appearance.

Embodiment 5

In this embodiment, 1) the screw 4 is a 20-equidistant screw, and the threads 4-1 are toothed threads with a height of 4 mm; the head of the screw 4 is provided with 4 groups of equidistant grooves 4-2; the grooves 4-2 are uniformly arranged along the outer circumference of the screw 4; the depth of the grooves 4-2 on the threads of the head of the screw 4 is the same as the height of the threads 4-1, and the width is 3 mm; 2) the glass round tube 7 with an inner diameter of 7.5 mm is connected behind the mouth mold 5 with an inner diameter of 7.0 mm, and the air-cooled cooler 6 surrounds the round tube 7; and 3) the distance between the inner end of the mouth mold 5 and the head of the screw is 10 mm, and the pressure relief plate 10 is a 50 mm*50 mm*10 mm (thickness) square block, and it is spaced from the machine head 9 by a gap of 4.5 mm. 1) Corncobs are purified, then steamed at a high temperature for sterilization, and dried in the sun; 2) the corncobs are mechanically pulverized, corncob particles of 20 to 80 meshes are screened out, and the moisture is equilibrated to 8% for later use; 3) a bean flavor is sprayed to the corncob particles by a mass ratio of 1%, followed by uniform mixing and vacuum microwave drying to a moisture of 6% to obtain flavored corncob particles; 4) white latex for cigarettes, which accounts for 10% of the weight of the flavored corncob particles, is sprayed to the flavored corncob particles, followed by uniform mixing; 5) the adhesive-applied flavored corncob particles are extruded by using an improved single-screw extruder, and the materials preliminarily molded by the mouth mold enter the glass round tube, and are further finely cooled for setting and then extruded out from the other end to obtain loose and air-permeable flavored corncob particle round rods having a density of 1.0 g/mL (a moisture content of 11%); and 6) the flavored corncob particle round rods extruded are cut to be 100 mm in length to obtain the required flavored corncob particle cigarette filter rods. The filter rods can be directly used for rolling cigarettes.

Embodiment 6

In this embodiment, 1) the screw 4 is a 20-equidistant screw, and the threads 4-1 are toothed threads with a height of 4 mm; the head of the screw 4 is provided with 3 groups of equidistant grooves 4-2; the grooves 4-2 are uniformly arranged along the outer circumference of the screw 4; the depth of the grooves 4-2 on the threads of the head of the screw 4 is the same as the height of the threads 4-1, and the width is 3 mm; 2) the glass round tube 7 with an inner diameter of 7.5 mm is connected behind the mouth mold 5 with an inner diameter of 7.2 mm, and the air-cooled cooler 6 surrounds the glass round tube 7; and 3) the distance between the inner end of the mouth mold 5 and the head of the screw is 30 mm, and the pressure relief plate 10 is a 80 mm*40 mm*10 mm (thickness) square block, and it is spaced from the machine head 9 by a gap of 3 mm.

1) Walnut shells are purified, then steamed at a high temperature for sterilization, and dried in the sun; 2) the walnut shells are mechanically pulverized, walnut shell particles of 20 to 80 meshes are screened out, and the moisture is equilibrated to 8% for later use; 3) peppermint essential oil is sprayed to the walnut shell particles by a mass ratio of 0.5%, followed by uniform mixing and vacuum microwave drying to a moisture of 6% to obtain flavored walnut shell particles; 4) polyvinyl alcohol accounting for 15% of the weight of the walnut shell particles is sprayed to the walnut shell particles, followed by uniform mixing; 5) the adhesive-applied walnut shell particles are extruded by using an improved single-screw extruder, and the materials preliminarily molded by the mouth mold enter the glass round tube, and are further finely cooled for setting and then extruded out from the other end to obtain loose and air-permeable walnut shell particle round rods having a density of 1.5 g/mL (a moisture content of 9%); and 6) the walnut shell particle round rods extruded are wrapped with molding paper, and then cut to be 120 mm in length to obtain the required degradable walnut shell particle cigarette filter rods. The filter rods are compounded with ordinary cellulose acetate rods in a length ratio of 15:10 for rolling cigarettes.

Embodiment 7

In this embodiment, 1) the screw 4 is a 20-equidistant screw, and the threads 4-1 are toothed threads with a height of 4 mm; the head of the screw 4 is provided with 5 groups of equidistant grooves 4-2; the grooves 4-2 are uniformly arranged along the outer circumference of the screw 4; the depth of the grooves 4-2 on the threads of the head of the screw 4 is the same as the height of the threads 4-1, and the width is 3 mm; 2) the glass round tube 7 with an inner diameter of 7.5 mm is connected behind the mouth mold 5 with an inner diameter of 6.8 mm, and the air-cooled cooler 6 surrounds the glass round tube 7; and 3) the distance between the inner end of the mouth mold 5 and the head of the screw is 10 mm, and the pressure relief plate 10 is a 50 mm*50 mm*10 mm (thickness) square block, and it is spaced from the machine head 9 by a gap of 4 mm.

1) Coffee shells and coconut shells are purified, then steamed at a high temperature for sterilization, and dried in the sun; 2) the coffee shells and the coconut shells are mechanically pulverized respectively, coffee shell powder and coconut shell powder of 20 to 80 meshes are screened out, and the moisture is equilibrated to 10% for later use;

3) the coffee shell powder and the coconut shell powder are mixed uniformly in a mass ratio of 2:1 to obtain mixed powder; 4) a strawberry essence is sprayed to the mixed powder by a mass ratio of 0.3%, followed by uniform mixing and vacuum microwave drying to a moisture of 6% to obtain flavored mixed powder; 5) a mixed adhesive of modified starch and Arabic gum (in a mass ratio of 3:1), which accounts for 18% of the weight of the mixed powder, is sprayed to the mixed powder, followed by uniform mixing; 6) the adhesive-applied mixed powder is extruded by using an improved single-screw extruder, and the materials preliminarily molded by the mouth mold enter the glass round tube, and are further finely cooled for setting and then extruded out from the other end to obtain loose and air-permeable mixed particle round rods having a density of 2.5 g/mL (a moisture content of 10%); and 7) the mixed particle round rods extruded are cut to be 100 mm in length to obtain the required degradable mixed particle cigarette filter rods. The filter rods can be directly used for rolling cigarettes.

Embodiment 8

In this embodiment, 1) the screw 4 is a 20-equidistant screw, and the threads 4-1 are toothed threads with a height of 4 mm; the head of the screw 4 is provided with 4 groups of equidistant grooves 4-2; the grooves 4-2 are uniformly arranged along the outer circumference of the screw 4; the depth of the grooves 4-2 on the threads of the head of the screw 4 is the same as the height of the threads, and the width is 3 mm; 2) the glass round tube 7 with an inner diameter of 7.5 mm is connected behind the mouth mold 5 with an inner diameter of 6.5 mm, and the air-cooled cooler 6 surrounds the glass round tube 7; and 3) the distance between the inner end of the mouth mold 5 and the head of the screw is 15 mm, and the pressure relief plate 10 is a 50 mm*50 mm*10 mm (thickness) square block, and it is spaced from the machine head 9 by a gap of 2 mm. 1) Softwood is purified, then steamed at a high temperature for sterilization, and dried in the sun; 2) the softwood is mechanically pulverized, softwood particles of 20 to 80 meshes are screened out, and the moisture is equilibrated to 10% for later use; 3) a milk flavor is sprayed to the softwood particles by a mass ratio of 1.2%, followed by uniform mixing and vacuum microwave drying to a moisture of 6% to obtain flavored softwood particles; 4) 15% of polyethylene hot melt adhesive by weight of the softwood particles is weighed and sprayed uniformly to the surfaces of the softwood particles after being melted, the softwood particles are extruded by using an improved single-screw extruder, and the materials preliminarily molded by the mouth mold enter the glass round tube, and are further finely cooled for setting and then extruded out from the other end to obtain softwood particle round rods having a density of 0.5 g/mL and a moisture content of 9%; and 5) the softwood particle round rods extruded are wrapped with molding paper, and then cut to be 100 mm in length to obtain the required degradable softwood particle cigarette filter rods. The filter rods can be directly used for rolling cigarettes.

Evaluation on Sample Cigarettes:

The cigarette filter rods prepared in Embodiments 4-8 are respectively rolled into cigarettes of the same brand, and the cigarettes are compared with conventional cigarettes (control group). The results are shown in Table 2.

TABLE 2

Comparison between Embodiments 4-8 and conventional cigarettes

| Sample | Smoking resistance of filter rod/Pa | Smoking resistance of cigarette/Pa | Hardness of filter rod/% | Roundness of filter rod/mm | TPM/mg/cig | Smoking evaluation |
|---|---|---|---|---|---|---|
| Control group | 2744 | 1078 | 88 | 0.35 | 12.30 | Mainly tobacco aroma, elegant and delicate aroma, ordinary amount of aroma, slight irritation |
| Embodiment 5 | 2600 | 1060 | 95 | 0.18 | 12.55 | When a cigarette package is opened, the aroma of cigarettes is mainly entrained with pleasant bean aroma, and the richness of aroma increases, with good coordination, obvious aftertaste of bean aroma |
| Embodiment 6 | 2700 | 1075 | 94 | 0.15 | 12.65 | When a cigarette package is opened, the aroma of cigarettes is mainly entrained with cool peppermint aroma, the richness of aroma increases, with good coordination and obvious aftertaste of peppermint aroma |
| Embodiment 7 | 2780 | 1080 | 96 | 0.19 | 12.60 | When a cigarette package is opened, the aroma of cigarettes is mainly entrained with pleasant strawberry aroma, the richness of aroma increases, with good coordination and obvious aftertaste of strawberry aroma |
| Embodiment 8 | 2800 | 1090 | 93 | 0.17 | 12.00 | When a cigarette package is opened, the aroma of cigarettes is mainly entrained with pleasant milk aroma, the richness of aroma increases, with good coordination and obvious aftertaste of milk aroma |

It can be seen from the above evaluation results that the filter rods prepared in the present invention have an obvious flavoring effect, and the smoke retention effect is equivalent to that of cellulose acetate cigarettes. The filter rods of the present invention have controllable smoking resistance, greatly improved hardness and distinctive appearance.

Embodiment 9

In this embodiment, 1) the screw 4 is a 20-equidistant screw, and the threads 4-1 are toothed threads with a height of 4 mm; the head of the screw 4 is provided with 4 groups of equidistant grooves 4-2; the grooves 4-2 are uniformly arranged along the outer circumference of the screw 4; the depth of the grooves 4-2 on the threads of the head of the screw 4 is the same as the height of the threads 4-1, and the width is 3 mm; 2) the glass round tube 7 with an inner diameter of 7.5 mm is connected behind the mouth mold 5 with an inner diameter of 7.0 mm, and the air-cooled cooler 6 surrounds the glass round tube 7; and 3) the distance between the inner end of the mouth mold 5 and the head of the screw is 15 mm, and the pressure relief plate 10 is a 50 mm*50 mm*10 mm (thickness) square block, and it is spaced from the machine head 9 by a gap of 2 mm.

1) Cloves are pulverized at 25° C. and sieved to obtain clove particles of 20-80 meshes for later use; 2) white latex for cigarettes, which accounts for 10% of the weight of the clove particles, is sprayed to the clove particles, followed by uniform mixing; 3) the adhesive-applied clove particles are extruded by using an improved single-screw extruder, and the material preliminarily molded by the mouth mold enter the glass round tube, and is further finely cooled for setting and then extruded out from the other end to obtain loose and air-permeable clove particle round rods having a density of 0.5 g/mL (a moisture content of 12%); and 4) the clove particle round rods extruded are cut to be 100 mm in length to obtain the required clove particle cigarette filter rods. The filter rods can be directly used for rolling cigarettes.

Embodiment 10

In this embodiment, 1) the screw 4 is a 20-equidistant screw, and the threads 4-1 are toothed threads with a height of 4 mm; the head of the screw 4 is provided with 3 groups of equidistant grooves 4-2; the grooves 4-2 are uniformly arranged along the outer circumference of the screw 4; the depth of the grooves 4-2 on the threads of the head of the screw 4 is the same as the height of the threads 4-1, and the width is 3 mm; 2) the glass round tube 7 with an inner diameter of 7.5 mm is connected behind the mouth mold 5 with an inner diameter of 6.5 mm, and the air-cooled cooler 6 surrounds the glass round tube 7; and 3) the distance between the inner end of the mouth mold 5 and the head of the screw is 8 mm, and the pressure relief plate 10 is a 90 mm*50 mm*10 mm (thickness) square block, and is spaced from the machine head 9 by a gap of 3 mm. 1) Fennel is pulverized at 35° C. and sieved to obtain fennel particles of 20 to 80 meshes for later use; 2) walnut shells are pulverized and sieved to obtain walnut shell particles of 20 to 80 meshes for later use; 3) the fennel particles are mixed with the walnut shell particles uniformly in a mass ratio 2:1 to obtain mixed fennel particles; 4) polyvinyl alcohol accounting for 15% of the weight of the mixed fennel particles is sprayed to the mixed fennel particles, followed by uniform mixing; 5) the adhesive-applied mixed fennel particles are extruded by using an improved single-screw extruder, and the materials preliminarily molded by the mouth mold enter the glass round tube, and are further finely cooled for setting and then extruded out from the other end to obtain loose and air-permeable mixed fennel particle round rods having a density of 1.5 g/mL (a moisture content of 8%); and 6) the mixed fennel particle round rods extruded are wrapped with molding paper, and cut to be 120 mm in length to obtain the required fennel particle cigarette filter rods. The filter rods are compounded with ordinary cellulose acetate rods in a length ratio of 15:10 for rolling cigarettes.

Embodiment 11

In this embodiment, 1) the screw 4 is a 20-equidistant screw, and the threads 4-1 are toothed threads with a height of 4 mm; the head of the screw 4 is provided with 5 groups of equidistant grooves 4-2; the grooves 4-2 are uniformly arranged along the outer circumference of the screw 4; the depth of the grooves 4-2 on the threads of the head of the screw 4 is the same as the height of the threads, and the width is 3 mm; 2) the glass round tube 7 with an inner diameter of 7.5 mm is connected behind the mouth mold 5 with an inner diameter of 6.8 mm, and the air-cooled cooler 6 surrounds the glass round tube 7; and 3) the distance between the inner end of the mouth mold 5 and the head of the screw is 15 mm, and the pressure relief plate 10 is a 50 mm*50 mm*10 mm (thickness) square block, and is spaced from the machine head 9 by a gap of 2 mm. 1) Coffee beans are pulverized into 150-mesh coffee powder; 2) coffee shells are pulverized into 150-mesh coffee shell powder; 3) the coffee powder is mixed with the coffee shell powder uniformly in a mass ratio of 1:3, and the mixture is prepared into coffee particles of 20 to 60 meshes by one-step granulation; 4) microcrystalline wax accounting for 5% of the weight of the coffee particles is sprayed to the surfaces of the coffee particles after being melted, followed by uniform mixing; 5) the adhesive-applied coffee particles are extruded by using an improved single-screw extruder, and the materials preliminarily molded by the mouth mold enter the glass round tube, and are further finely cooled for setting and then extruded out from the other end to obtain loose and air-permeable mixed particle round rods having a density of 1.0 g/mL (a moisture content of 9%); and 6) the mixed particle round rods extruded are cut to be 100 mm in length to obtain the required coffee-flavor particle cigarette filter rods. The filter rods can be directly used for rolling cigarettes.

Embodiment 12

In this embodiment, 1) the screw 4 is a 20-equidistant screw, and the threads 4-1 are toothed threads with a height of 4 mm; the head of the screw 4 is provided with 4 groups of equidistant grooves 4-2; the grooves 4-2 are uniformly arranged along the outer circumference of the screw 4; the depth of the grooves 4-2 on the threads of the head of the screw 4 is the same as the height of the threads 4-1, and the width is 3 mm; 2) the glass round tube 7 with an inner diameter of 7.5 mm is connected behind the mouth mold with an inner diameter of 7.2 mm, and the air-cooled cooler 6 surrounds the glass round tube 7; and 3) the distance between the inner end of the mouth mold 5 and the head of the screw is 15 mm, and the pressure relief plate 10 is a 50 mm*50 mm*10 mm (thickness) square block, and is spaced from the machine head 9 by a gap of 2 mm.

1) Lily is pulverized at 40° C. into 120-mesh lily powder; 2) rose is pulverized into 120-mesh rose powder; 3) grapefruit peel is pulverized into 120-mesh grapefruit peel powder; 4) the lily powder, the rose powder and the grapefruit peel powder are mixed uniformly in a mass ratio of 5:10:10, and granulated into 30 to 80 meshes by a wet method to obtain flowery particles with a moisture content of 10%; 5) polyethylene accounting for 8% of the weight of the flowery particles is melted and then sprayed to the surfaces of the flowery particles, followed by uniform mixing; 6) the adhesive-applied flowery particles are extruded by using an improved single-screw extruder, and the materials preliminarily molded by the mouth mold enter the glass round tube, and are further finely cooled for setting and then extruded out from the other end to obtain flowery particle round rods having a density of 0.8 g/mL and a moisture content of 9%; and 7) the flowery particle round rods extruded are wrapped with molding paper, and then cut to be 100 mm in length to obtain the required flowery particle cigarette filter rods. The filter rods can be directly used for rolling cigarettes.

Evaluation on Sample Cigarettes:

The cigarette filter rods prepared in Embodiments 9-12 are respectively rolled into cigarettes of the same brand, and the cigarettes are compared with conventional cellulose acetate filter rod cigarettes. The results are shown in Table 3.

TABLE 3

Comparison between cigarette filter rods of Embodiments 9-12 and conventional cellulose acetate filter rod cigarettes

| Sample | Smoking resistance of filter rod/Pa | Smoking resistance of cigarette/Pa | Hardness of filter rod/% | Roundness of filter rod/mm | TPM/ mg/cig | Smoking evaluation |
|---|---|---|---|---|---|---|
| Control | 2744 | 1078 | 88 | 0.33 | 12.30 | Mainly tobacco aroma, elegant and delicate aroma, ordinary amount of aroma, slight irritation |
| Embodiment 9 | 2700 | 1060 | 90 | 0.19 | 12.65 | When a cigarette package is opened, the aroma of cigarettes is mainly entrained with pleasant clove aroma, the richness of aroma increases, with good coordination and obvious aftertaste of clove aroma |
| Embodiment 10 | 2830 | 1095 | 92 | 0.16 | 12.05 | When a cigarette package is opened, the aroma of cigarettes is mainly entrained with fennel aroma, the richness of aroma increases, with good coordination and obvious aftertaste of fennel aroma |
| Embodiment 11 | 2780 | 1080 | 92 | 0.20 | 12.60 | When a cigarette package is opened, the aroma of cigarettes is mainly entrained with pleasant coffee aroma, the richness of aroma increases, with good coordination and obvious aftertaste of coffee aroma |
| Embodiment 12 | 2750 | 1070 | 91 | 0.15 | 12.20 | When a cigarette package is opened, the aroma of cigarettes is mainly entrained with pleasant mixed flower aroma, the richness of aroma increases, with good coordination and obvious aftertaste of flower aroma |

It can be seen from the above evaluation results that the filter rods prepared in the present invention have obvious olfactory aroma and obvious flavoring effect, and the smoke retention effect is equivalent to that of cellulose acetate cigarettes. The filter rods of the present invention have controllable smoking resistance, greatly improved hardness and distinctive appearance.

Embodiment 13

In this embodiment, 1) the screw is a 20-equidistant screw, and the threads are toothed threads with a height of 4 mm; grooves on the threads of the head of the screw have a depth identical to the height of the threads and a width of 3 mm; the head of the screw is provided with 4 groups of equidistant grooves; 2) the glass round tube with an inner diameter of 7.5 mm is connected behind the mouth mold with an inner diameter of 7.0 mm, and the air-cooled cooler surrounds the round tube; and 3) the distance between the inner end of the mouth mold 5 and the head of the screw is 15 mm, and the pressure relief plate 10 is a 50 mm*50 mm*10 mm (thickness) square block, and it is spaced from the machine head 9 by a gap of 2 mm.

1) Corncobs are purified, then steamed at a high temperature for sterilization, and dried in the sun; 2) the corncobs are mechanically pulverized, corncob particles of 30 to 50 meshes are screened out, and the moisture is equilibrated to 8% for later use; 3) the corncob particles are mixed with polyethylene micropowder in an ultra-high-speed mixer according to a mass ratio of 100:5, and a hot-melt adhesive is melted by means of self-friction heat generated during the ultra-high-speed mixing process to form a plurality of adhesive spots on the surfaces of the corncob particles; 4) ventilation and cooling while low-speed mixing are performed to avoid bonding of the materials; 5) the adhesive-applied corncob particles are extruded by using an improved single-screw extruder, and the materials preliminarily molded by the mouth mold enter the glass round tube, and are further finely cooled for setting and then extruded out from the other end to obtain loose and air-permeable corncob particle round rods having a density of 1.0 g/mL; and 6) the corncob particle round rods extruded are cut to be 100 mm in length to obtain the required environment-friendly corncob particle cigarette filter rods. The filter rods can be directly used for rolling cigarettes.

Embodiment 14

In this embodiment, 1) the screw is a 20-equidistant screw, and the threads are toothed threads with a height of 4 mm; grooves on the threads of the head of the screw have a depth identical to the height of the threads and a width of 3 mm; the head of the screw is provided with 4 groups of equidistant grooves; 2) the glass round tube with an inner diameter of 7.5 mm is connected behind the mouth mold with an inner diameter of 6.5 mm, and the air-cooled cooler surrounds the round tube; and 3) the distance between the inner end of the mouth mold 5 and the head of the screw is 15 mm, and the pressure relief plate 10 is a 50 mm*50 mm*10 mm (thickness) square block, and it is spaced from the machine head 9 by a gap of 2 mm.

1) Walnut shells are purified, then steamed at a high temperature for sterilization, and dried in the sun; 2) the walnut shells are mechanically pulverized, walnut shell particles of 40 to 60 meshes are screened out, and the moisture is equilibrated to 8% for later use;

3) the walnut shell particles are mixed with vinyl acetate micropowder in an ultra-high-speed mixer according to a mass ratio of 100:8, and a hot-melt adhesive is quickly melted by electric heating inside the ultra-high-speed mixer to form a plurality of adhesive spots on the surfaces of the walnut shell particles; 4) the electric heating is closed, followed by ventilating and cooling while low-speed mixing to avoid bonding of the materials; 5) the adhesive-applied walnut shell particles are extruded by using an improved single-screw extruder, and the materials preliminarily molded by the mouth mold enter the glass round tube, and are further finely cooled for setting and then extruded out from the other end to obtain loose and air-permeable walnut shell particle round rods having a density of 1.5 g/mL; and 6) the walnut shell particle round rods extruded are wrapped with molding paper and cut to be 120 mm in length to obtain the required environment-friendly walnut shell particle cigarette filter rods. The filter rods are compounded with ordinary cellulose acetate rods in a length ratio of 15:10 for rolling cigarettes.

Embodiment 15

In this embodiment, 1) the screw is a 20-equidistant screw, the threads are toothed threads with a height of 4 mm, and the head of the screw is provided with 4 groups of equidistant grooves; the depth of the grooves on the threads of the head of the screw is the same as the height of the threads, and the width is 3 mm; 2) the glass round tube with an inner diameter of 7.5 mm is connected behind the mouth mold with an inner diameter of 7.0 mm, and the air-cooled cooler surrounds the round tube; and 3) the distance between the inner end of the mouth mold 5 and the head of the screw is 15 mm, and the pressure relief plate 10 is a 50 mm*50 mm*10 mm (thickness) square block, and it is spaced from the machine head 9 by a gap of 2 mm.

1) Coffee shells and coconut shells are purified, then respectively steamed at a high temperature for sterilization, and dried in the sun; 2) the coffee shells and the coconut shells are respectively mechanically pulverized, coffee shell powder and coconut shell powder of 20 to 80 meshes are screened out, and the moisture is equilibrated to 10% for later use; 3) the coffee shell powder and the coconut shell powder are mixed uniformly in a mass ratio of 2:1 to obtain mixed powder; 4) the mixed powder is mixed with polymerized rosin micropowder in an ultra-high-speed mixer according to a mass ratio of 100:8, and a hot-melt adhesive is melted by means of self-friction heat generated during the ultra-high-speed mixing process to form a plurality of adhesive spots on the surfaces of the mixed powder particles; 5) ventilation and cooling while low-speed mixing are performed to avoid bonding of the materials; 6) the adhesive-applied mixed powder particles are extruded by using an improved single-screw extruder, and the materials preliminarily molded by the mouth mold enter the glass round tube, and are further finely cooled for setting and then extruded out from the other end to obtain loose and air-permeable mixed powder particle round rods having a density of 2.5 g/mL; and 7) the mixed powder particle round rods extruded are wrapped with molding paper and cut to be 120 mm in length to obtain the required environment-friendly mixed powder particle cigarette filter rods. The filter rods are compounded with ordinary cellulose acetate rods in a length ratio of 15:10 for rolling cigarettes.

Embodiment 16

In this embodiment, 1) the screw is a 20-equidistant screw, and the threads are toothed threads with a height of 4 mm; grooves on the threads of the head of the screw have a depth identical to the height of the threads and a width of 3 mm; the head of the screw is provided with 4 groups of equidistant grooves; 2) the glass round tube with an inner diameter of 7.5 mm is connected behind the mouth mold 5 with an inner diameter of 7.0 mm, and the air-cooled cooler surrounds the round tube; and 3) the distance between the inner end of the mouth mold 5 and the head of the screw is 15 mm, and the pressure relief plate 10 is a 50 mm*50 mm*10 mm (thickness) square block, and it is spaced from the machine head 9 by a gap of 2 mm.

1) Softwood is purified, then steamed at a high temperature for sterilization, and dried in the sun; 2) the softwood is mechanically pulverized, softwood particles of 20 to 80 meshes are screened out, and the moisture is equilibrated to 10% for later use; 3) the softwood particles are mixed with microcrystalline wax micropowder in an ultra-high-speed mixer according to a mass ratio of 100:10, and a hot-melt adhesive is melted by means of self-friction heat generated during the ultra-high-speed mixing process to form a plurality of adhesive spots on the surfaces of the softwood particles; 4) ventilation and cooling while low-speed mixing are performed to avoid bonding of the materials; 5) the adhesive-applied softwood particles are extruded by using an improved single-screw extruder, and the materials preliminarily molded by the mouth mold enter the glass round tube, and are further finely cooled for setting and then extruded out from the other end to obtain loose and air-permeable softwood particle round rods having a density of 0.7 g/mL; and 6) the softwood particle round rods extruded are cut into 100 mm lengths to obtain the required environment-friendly softwood particle cigarette filter rods. The filter rods can be directly used for rolling cigarettes.

Evaluation on Sample Cigarettes:

The cigarette filter rods prepared in Embodiments 13-16 are respectively rolled into cigarettes of the same brand, and the cigarettes are compared with conventional cigarettes. The results are shown in Table 4.

It can be seen from the above evaluation results that the cigarette products prepared from the filter rods of the present invention are equivalent to conventional cigarettes in smoking quality and smoke retention effect. The filter rods of the present invention have controllable smoking resistance, greatly improved hardness and distinctive appearance. The production costs of the filter rods of the present invention are significantly lower than those of cellulose acetate filter rods.

Embodiment 17

In this embodiment, 1) the screw is a 20-equidistant screw, and the threads are toothed threads with a height of 4 mm; grooves on the threads of the head of the screw have a depth identical to the height of the threads and a width of 3 mm, and the head of the screw is provided with 4 groups of equidistant grooves; 2) the glass round tube with an inner diameter of 7.5 mm is connected behind the mouth mold with an inner diameter of 7.0 mm, and the air-cooled cooler surrounds the round tube; and 3) the distance between the inner end of the mouth mold 5 and the head of the screw is 15 mm, and the pressure relief plate 10 is a 50 mm*50 mm*10 mm (thickness) square block, and it is spaced from the machine head 9 by a gap of 2 mm.

1) Corncobs are purified, then steamed at a high temperature for sterilization, and dried in the sun; 2) the corncobs are mechanically pulverized, corncob particles of 30 to 50 meshes are screened out, and the moisture is equilibrated to 6% for later use; 3) white latex for cigarettes, which accounts for 10% of the weight of the corncob particles, is sprayed to the corncob particles, followed by uniform mixing; 4) the adhesive-applied corncob particles are extruded by using an improved single-screw extruder, and the materials preliminarily molded by the mouth mold enter the glass round tube, and are further finely cooled for setting and then extruded out from the other end to obtain loose and air-permeable corncob particle round rods having a density of 1.0 g/mL; and 5) the corncob particle round rods extruded

TABLE 4

Comparison between cigarette filter rods prepared in Embodiments 13-16 and control group

| Sample | Smoking resistance of filter rod/Pa | Smoking resistance of cigarette/Pa | Hardness of filter rod/% | Appearance of filter rod | TPM/ mg/cig | Smoking evaluation |
|---|---|---|---|---|---|---|
| Control | 2744 | 1078 | 88 | White, conventional | 12.30 | Good coordination, and strong satisfaction |
| Embodiment 13 | 2630 | 990 | 95 | light yellow, porous | 12.50 | Good coordination, strong satisfaction, comfortable aftertaste |
| Embodiment 14 | 2680 | 1040 | 95 | brown, porous | 12.55 | Good coordination and strong satisfaction |
| Embodiment 15 | 2750 | 1090 | 96 | Mixed coffee/cream color, porous | 12.59 | Good coordination, strong satisfaction, comfortable aftertaste |
| Embodiment 16 | 2860 | 1110 | 92 | Coffee, porous | 11.88 | Good coordination and strong satisfaction | are cut to be 100 mm in length to obtain the required degradable corncob particle cigarette filter rods. The filter rods can be directly used for rolling cigarettes.

Embodiment 18

In this embodiment, 1) the screw is a 20-equidistant screw, and the threads are toothed threads with a height of 4 mm; grooves on the threads of the head of the screw have a depth identical to the height of the threads and a width of 3 mm, and the head of the screw is provided with 4 groups of equidistant grooves; 2) the glass round tube with an inner diameter of 7.5 mm is connected behind the mouth mold with an inner diameter of 6.5 mm, and the air-cooled cooler surrounds the round tube; and 3) the distance between the inner end of the mouth mold 5 and the head of the screw is 15 mm, and the pressure relief plate 10 is a 50 mm*50 mm*10 mm (thickness) square block, and it is spaced from the machine head 9 by a gap of 2 mm.

1) Walnut shells are purified, then steamed at a high temperature for sterilization, and dried in the sun; 2) the walnut shells are mechanically pulverized, walnut shell particles of 40 to 60 meshes are screened out, and the moisture is equilibrated to 8% for later use; 3) polyvinyl alcohol accounting for 15% of the weight of the walnut shell particles is sprayed to the walnut shell particles, followed by uniform mixing; 4) the adhesive-applied walnut shell particles are extruded by using an improved single-screw extruder, and the materials preliminarily molded by the mouth mold enter the glass round tube, and are further finely cooled for setting and then extruded out from the other end to obtain loose and air-permeable walnut shell particle round rods having a density of 1.5 g/mL; and 5) the walnut shell particle round rods extruded are wrapped with molding paper and cut to be 120 mm in length to obtain the required degradable walnut shell particle cigarette filter rods. The filter rods are compounded with ordinary cellulose acetate rods in a length ratio of 15:10 for rolling cigarettes.

Embodiment 19

In this embodiment, 1) the screw is a 20-equidistant screw, and the threads are toothed threads with a height of 4 mm; grooves on the threads of the head of the screw have a depth identical to the height of the threads and a width of 3 mm, and the head of the screw is provided with 4 groups of equidistant grooves; 2) the glass round tube with an inner diameter of 7.5 mm is connected behind the mouth mold with an inner diameter of 7.0 mm, and the air-cooled cooler surrounds the round tube; and 3) the distance between the inner end of the mouth mold 5 and the head of the screw is 15 mm, and the pressure relief plate 10 is a 50 mm*50 mm*10 mm (thickness) square block, and it is spaced from the machine head 9 by a gap of 2 mm.

1) Coffee shells and coconut shells are purified, then steamed at a high temperature for sterilization, and dried in the sun; 2) the coffee shells and the coconut shells are mechanically pulverized respectively, coffee shell powder and coconut shell powder of 20 to 80 meshes are screened out, and the moisture is equilibrated to 10% for later use; 3) the coffee shell powder and the coconut shell powder are mixed uniformly in a mass ratio of 2:1 to obtain mixed powder; 4) a mixed adhesive of modified starch and Arabic gum (in a mass ratio of 3:1), which accounts for 18% of the weight of the mixed powder, is sprayed to the mixed powder, followed by uniform mixing; 5) the adhesive-applied mixed powder is extruded by using an improved single-screw extruder, and the materials preliminarily molded by the mouth mold enter the glass round tube, and are further finely cooled for setting and then extruded out from the other end to obtain loose and air-permeable mixed particle round rods having a density of 2.5 g/mL; and 6) the mixed particle round rods extruded are cut to be 100 mm in length to obtain the required degradable mixed particle cigarette filter rods. The filter rods can be directly used for rolling cigarettes.

Embodiment 20

In this embodiment, 1) the screw is a 20-equidistant screw, and the threads are toothed threads with a height of 4 mm; grooves on the threads of the head of the screw have a depth identical to the height of the threads and a width of 3 mm, and the head of the screw is provided with 4 groups of equidistant grooves; 2) the glass round tube with an inner diameter of 7.5 mm is connected behind the mouth mold with an inner diameter of 7.0 mm, and the air-cooled cooler surrounds the round tube; and 3) the distance between the inner end of the mouth mold 5 and the head of the screw is 15 mm, and the pressure relief plate 10 is a 50 mm*50 mm*10 mm (thickness) square block, and it is spaced from the machine head 9 by a gap of 2 mm.

1) Softwood is purified, then steamed at a high temperature for sterilization, and dried in the sun; 2) the softwood is mechanically pulverized, softwood particles of 20 to 80 meshes are screened out, and the moisture is equilibrated to 10% for later use; 3) 15% of polyethylene hot melt adhesive by weight of the softwood particles is weighed and sprayed uniformly to the surfaces of the softwood particles after being melted, the softwood particles are extruded by using an improved single-screw extruder, and the materials preliminarily molded by the mouth mold enter the glass round tube, and are further finely cooled for setting and then extruded out from the other end to obtain softwood particle round rods having a density of 0.5 g/mL and a moisture content of 9%; and 4) the softwood particle round rods extruded are wrapped with molding paper, and then cut to be 100 mm in length to obtain the required degradable softwood particle cigarette filter rods. The filter rods can be directly used for rolling cigarettes.

Evaluation on Sample Cigarettes:

The cigarette filter rods prepared in Embodiments 17-20 are respectively rolled into cigarettes of the same brand, and the cigarettes are compared with conventional cigarettes. The results are shown in Table 5.

TABLE 5

Comparison between Embodiments 17-20 and control group

| Sample | Smoking resistance of filter rod/Pa | Smoking resistance of cigarette/Pa | Hardness of filter rod/% | Appearance of filter rod | Total particulate matter/ mg/cig | Smoking evaluation |
|---|---|---|---|---|---|---|
| Control | 2744 | 1078 | 88 | White, conventional | 12.30 | Good coordination and strong satisfaction |
| Embodiment 17 | 2600 | 1060 | 95 | light yellow, porous | 12.55 | Good coordination, strong satisfaction, comfortable aftertaste |
| Embodiment 18 | 2700 | 1075 | 94 | brown, porous | 12.65 | Good coordination and strong satisfaction |
| Embodiment 19 | 2780 | 1080 | 96 | Mixed coffee/cream color, porous | 12.60 | Good coordination strong satisfaction, comfortable aftertaste |
| Embodiment 20 | 2800 | 1090 | 93 | Coffee, porous | 12.00 | Good coordination and strong satisfaction |

It can be seen from the above evaluation results that the cigarette products prepared from the filter rods of the present invention are equivalent to conventional cigarettes in smoking quality and smoke retention effect. The filter rods of the present invention have controllable resistance, greatly improved hardness, and distinctive appearance. The production costs of the filter rods of the present invention are significantly lower than those of cellulose acetate filter rods.

Embodiment 21

In this embodiment, 1) the screw is a 20-equidistant screw, and the threads are toothed threads with a height of 4 mm; grooves on the threads of the head of the screw have a depth identical to the height of the threads and a width of 3 mm, and the head of the screw is provided with 4 groups of equidistant grooves; and 2) a shuttle-type shunt 8 is arranged at the mouth mold, the shuttle-type shunt has a radius of 4 mm at the maximum cross section and its cross section is circular, the mouth mold has an outer diameter of 7.5 mm and its cross section is circular.

Waste tobacco powder (60-100 meshes) produced in cigarette production is mixed with modified starch uniformly in a mass ratio of 100:15, and the inside of the screw of the extruder and the outer wall of the cylinder are passed through circulating cooling water to ensure that the temperature of the materials in the cylinder is not more than 60° C.; the materials are cut into 84 mm long hollow cigarette filter rods by using a cutting machine; and the hollow cigarette filter rods are compounded with 108 mm cellulose acetate filter rods in a ratio of 7:18 into dual-segment hollow composite filter rods for direct use in cigarette production, wherein the hollow core sections of the prepared cigarettes are near the lips. Hollow composite cellulose acetate filters are simultaneously prepared as a control. The results of smoke test data show that the hollow filter rods of the present invention have the same retention effect as hollow cellulose acetate filter rods. The preliminary evaluation suggests that the aftertaste of the trial samples during smoking is more comfortable and the aroma of tobacco is more abundant. At the same time, the appearance of the sample cigarette is more novel, and the end of the filter rod also has strong tobacco aroma.

TABLE 6

Comparison of differences between hollow rods of the present invention and existing hollow cellulose acetate rods

| | Required equipment and condition | Production process | Raw material cost | Function and effect | Safety |
|---|---|---|---|---|---|
| Hollow cellulose acetate rod | Special filter rod molding machine, over ten million yuan per machine, strict plant conditions and a large number of supporting facilities. | Compared with ordinary cellulose acetate filter rods, the process is more complicated, only a few enterprises at home have this capability, and the requirements | Cellulose acetate is costly and the supply is limited, more than 40,000 yuan per ton. | Almost have no retention effect, and more decoration. | The safety is controversial, the production process is not environment-friendly, and it is difficult to degrade and easily causes secondary pollution. |

TABLE 6-continued

Comparison of differences between hollow rods of the present invention and existing hollow cellulose acetate rods

| | Required equipment and condition | Production process | Raw material cost | Function and effect | Safety |
|---|---|---|---|---|---|
| | | for humans and equipment are high. | | | |
| The present invention | Each of the screw extruder and cutting machine does not exceed 200,000 yuan, without a large number of supporting facilities and harsh site conditions. | Simple process and simple operation. | Tobacco waste or low-grade tobacco can be recycled, so the cost is low. | Equivalent retention effect, more outstanding decoration effect, with flavoring function. | Derived from tobacco itself, it is safe, reliable and degradable and will not cause environmental pollution. |

Embodiment 22

In the following embodiment: 1) the screw is a 20-equidistant screw, and the threads are 4 mm high toothed threads; grooves on the threads of the head of the screw have a depth identical to the height of the threads and a width of 3 mm, and the head of the screw is provided with 4 groups of equidistant grooves; and 2) a shuttle-type shunt 8 is arranged at the mouth mold, the cross section of the shuttle-type shunt is heart-shaped, the mouth mold has an outer diameter of 7.5 mm and its cross section is circular; and the area of the maximum cross section of the shuttle-type shunt is 60% of the cross-sectional area of the mouth mold.

Upper tobacco leaves that are difficult to use in the production formula of cigarettes are mechanically pulverized into powder particles of 40 to 100 meshes; the powder particles are mixed with hydroxymethyl cellulose and xanthan gum uniformly in a mass ratio of 100:10:10; the inside of the screw of the extruder and the outer wall of the cylinder are passed through circulating cooling water to ensure that the temperature of the materials in the cylinder is not more than 60° C.; the materials are cut into 120 mm long hollow cigarette filter rods by using a cutting machine; and the hollow cigarette filter rods are compounded with 120 mm cellulose acetate filter rods in a ratio of 10:15 into dual-segment hollow composite filter rods for direct use in cigarette production, wherein the hollow core sections of the prepared cigarettes are near the lips. Hollow composite cellulose acetate filters are simultaneously prepared as a control. The results of smoke test data show that the hollow filter rods of the present invention have the same retention effect as hollow cellulose acetate filter rods. The preliminary evaluation suggests that the aftertaste of the trial samples during smoking is more comfortable and the aroma of tobacco is more abundant. At the same time, the appearance of the sample cigarette is more novel, and the end of the filter rod also has strong tobacco aroma.

Embodiment 23

The cross section of the solid cylinder of the mold used in this embodiment is quincuncial, the outer diameter of the annular cavity is 7.5 mm, the quincuncial area is 50% of the cross-sectional area of the annular cavity, and the annular cavity is fixed on the base during the production process.

Waste tobacco powder produced in cigarette production is sieved to obtain powder of 80 to 120 meshes, the powder is mixed with polyurethane hot melt adhesive powder uniformly in a mass ratio of 100:20, the materials are quantitatively added into a special mold for hydraulic molding, the materials are heated to 80° C. and the pressure is maintained for 60 s; demolding and air cooling to room temperature are performed to obtain hollow cigarette filter rods having a length of 84 mm, an outer diameter of 7.5 mm and a quincuncial core, wherein the cross-sectional area of the core is 50% of all the cross-sectional area of the filter rod; and the hollow cigarette filter rods are compounded with 108 mm cellulose acetate filter rods in a ratio of 7:18 into dual-segment hollow composite filter rods for direct use in cigarette production, wherein the hollow core sections of the prepared cigarettes are near the lips. Hollow composite cellulose acetate filters are simultaneously prepared as a control. The results of smoke test data show that the hollow filter rods of the present invention have the same retention effect as hollow cellulose acetate filter rods. The preliminary evaluation suggests that the aftertaste of the trial samples during smoking is more comfortable and the aroma of tobacco is more abundant. At the same time, the appearance of the sample cigarette is more novel, and the end of the filter rod also has strong tobacco aroma.

Comparative Example 1

In this comparative example, a commercially available conventional single-screw extruder is used to prepare hollow cigarette filter rods, a shuttle-type shunt is arranged at the mouth mold, the shuttle-type shunt has a radius of 4 mm at the maximum cross section and its cross section is circular, the mouth mold has an outer diameter of 7.5 mm and its cross section is circular.

Waste tobacco powder produced in cigarette production is mixed with modified starch uniformly in a mass ratio of 100:15, and the inside of the screw of the extruder and the outer wall of the cylinder are passed through circulating cooling water to ensure that the temperature of the materials in the cylinder is not more than 60° C.; the materials are cut into 84 mm long hollow cigarette filter rods by using a cutting machine; and the hollow cigarette filter rods are compounded with 108 mm cellulose acetate filter rods in a ratio of 7:18 into dual-segment hollow composite filter rods for direct use in cigarette production, wherein the hollow core sections of the prepared cigarettes are near the lips. Hollow composite cellulose acetate filters are simultaneously prepared as a control.

During the molding process, it is found that the hollow rods prepared are extremely dense and hard, are difficult to cut and severely wear the cutting tool. The results of smoke test data show that the tar content of cigarettes prepared from the hollow filter rods of this example is 1.0 mg/cig higher than that of hollow cellulose acetate filter rods, and the smoke retention effect is worse than that of the hollow cellulose acetate filter rods. The preliminary smoking evaluation suggests that the smoke quality of the two is not much different.

The contents illustrated by the above embodiments should be understood as these embodiments are merely used for illustrating the present invention more clearly, rather than limiting the scope of the present invention. Various equivalent modifications made to the present invention by those skilled in the art after reading the present invention all fall within the scope defined by the appended claims of the present application.

The invention claimed is:

1. A molding apparatus, comprising a single-screw extrusion system and a cooling setting system, wherein:
   the single-screw extrusion system comprises a feeder (1) and an extruder (2);
   the feeder (1) is arranged on the extruder (2);
   the extruder comprises a cylinder (11),
   a heater (3) is arranged outside the cylinder,
   a screw (4) is arranged inside the cylinder, and
   a mouth mold (5) is arranged at one end of the cylinder and connected to the cooling setting system;
   the cooling setting system comprises a round tube (7) and a cooler (6);
   the cooler (6) is arranged outside the round tube (7);
   one end of the round tube (7) is butted with the mouth mold (5) of the extruder (2); and
   multiple groups of grooves (4-2) are formed on threads of a head of the screw (4), wherein the multiple groups of grooves (4-2) are proximal to the mouth mold (5).

2. The molding apparatus according to claim 1, wherein:
   a machine head (9) is mounted at an outlet end of the cylinder,
   the mouth mold (5) is mounted on the machine head (9) through a pressure relief plate (10) and extends into the cylinder (11), and
   the mouth mold (5) is movably connected with the machine head.

3. The molding apparatus according to claim 1, wherein a distance between a feeding end of the mouth mold and the head of the screw is 5 to 60 mm.

4. The molding apparatus according to claim 2, wherein:
   the pressure relief plate is fixed in a center of the machine head, and
   an adjustable gap of 1 to 5 mm is maintained between the pressure relief plate and the machine head.

5. The molding apparatus according to claim 1, wherein the multiple groups of grooves have a depth identical to a height of the threads, and a width of 2 to 4 mm.

6. The molding apparatus according to claim 1, wherein 3 to 5 groups of grooves parallel to an axis of the screw are formed on the threads of the screw.

7. The molding apparatus according to claim 1, wherein the groups of grooves are uniformly distributed on an outer circumference of the screw.

8. The molding apparatus according to claim 1, wherein:
   the screw comprises equidistant threads, and
   the threads are rectangular, trapezoidal or toothed threads having a height of 3 to 5 mm.

9. The molding apparatus according to claim 1, wherein a shuttle-type shunt is arranged at the mouth mold of the cylinder.

10. The molding apparatus according to claim 9, wherein a cross section of the shuttle-type shunt is circular, elliptical, polygonal, quincuncial or heart-shaped.

11. The molding apparatus according to claim 9, wherein an area of a maximum cross section of the shuttle-type shunt is 20-80% of a cross-sectional area of the mouth mold.

12. A preparation method of cigarette filter rods, carried out using the molding apparatus according to claim 1, comprising the following steps:
   S1, obtaining a mixture by mixing a raw material with an adhesive uniformly;
   wherein, the raw material comprises one of natural plant particles, tobacco particles, flavored plant particles, and tobacco powder;
   S2, continuously feeding the mixture obtained in S1 into the cylinder of the extruder through the feeder, extruding the mixture from the mouth mold into the round tube of the cooling setting system under the extrusion of the screw, followed by cooling setting and extrusion to obtain particle round rods; and
   S3, directly cutting the particle round rods obtained in S2 or wrapping the particle round rods with molding paper and then cutting them to obtain the cigarette filter rods.

13. The preparation method of cigarette filter rods according to claim 12, wherein before S1, natural plant materials are pulverized and sieved to obtain natural plant particles, or natural plant materials are pulverized, granulated, and sieved to obtain natural plant particles.

14. The preparation method of cigarette filter rods according to claim 13, wherein: the natural plant materials comprise at least one of shells, residues and cores of commercial crops, melon peels, wood, rice husks, bagasse, corncobs, walnut shells, coffee shells, peanut shells, softwood, coconut shells, orange peels, and grapefruit peels.

15. The preparation method of cigarette filter rods according to claim 12, wherein: before S1, edible flavors are mixed with the particles of natural plant materials to obtain flavored plant particles; and the edible flavors comprise at least one of citrus flavors, fruit flavors, peppermint flavors, bean flavors, spicy flavors, milk flavors, meat flavors, nut flavors, liquor flavors, and vegetable flavors.

16. The preparation method of cigarette filter rods according to claim 12, wherein:
   the tobacco particles are tobacco stem particles and/or reconstituted tobacco particles;
   the tobacco stem particles are obtained by pulverizing tobacco stems and then screening;
   the reconstituted tobacco particles are obtained by pulverizing tobacco raw materials, granulating, and screening; and
   the tobacco raw materials comprise tobacco leaves and tobacco stems.

17. The preparation method of cigarette filter rods according to claim 12, wherein: the natural plant materials comprise natural plant flavors; and the natural plant flavors comprise at least one of clove, agastache rugosa, galangal, fennel, peppermint, angelica dahurica, cardamom, perilla, lily, coffee, cocoa, rose, coconut flour, sesame, and tea.

18. The preparation method of cigarette filter rods according to claim 17, wherein: the natural plant materials further comprise natural plant accessories; the natural plant accessories comprise at least one of shells of commercial crops, fruit peels, wood, rice hulls, bagasse, corncobs, walnut shells, coffee shells, peanut shells, softwood, coconut shells, orange peels, and grapefruit peels.

19. The preparation method of cigarette filter rods according to claim 18, wherein: in the natural plant materials, the weight part of the natural plant flavors is 1-100 parts, and the weight part of the natural plant accessories is less than or equal to 99 parts.

20. The preparation method of cigarette filter rods according to claim 18, wherein: in the natural plant materials, the weight part of the natural plant flavors is 5-100 parts, and the weight part of the natural plant accessories is less than or equal to 95 parts.

* * * * *